United States Patent
Youn et al.

(10) Patent No.: US 12,395,016 B2
(45) Date of Patent: Aug. 19, 2025

(54) METHOD AND DEVICE FOR IMPROVING COMMUNICATION QUALITY ON BASIS OF PWM IN WIRELESS POWER TRANSMISSION SYSTEM

(71) Applicant: LG Electronics Inc., Seoul (KR)

(72) Inventors: Jinho Youn, Seoul (KR); Taewook Kwon, Seoul (KR); Gyunghwan Yook, Seoul (KR); Yongcheol Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/283,720

(22) PCT Filed: Mar. 22, 2022

(86) PCT No.: PCT/KR2022/003967
§ 371 (c)(1),
(2) Date: Sep. 22, 2023

(87) PCT Pub. No.: WO2022/203343
PCT Pub. Date: Sep. 29, 2022

(65) Prior Publication Data
US 2024/0178703 A1  May 30, 2024

(30) Foreign Application Priority Data
Mar. 23, 2021  (KR) ........................ 10-2021-0037522

(51) Int. Cl.
*H02J 50/40* (2016.01)
*H02J 50/12* (2016.01)
*H02J 50/80* (2016.01)
*H04B 5/79* (2024.01)

(52) U.S. Cl.
CPC .............. *H02J 50/40* (2016.02); *H02J 50/12* (2016.02); *H02J 50/80* (2016.02); *H04B 5/79* (2024.01)

(58) Field of Classification Search
CPC .. H02J 50/40; H02J 50/12; H02J 50/80; H02J 7/00034; H02J 50/20; H04B 5/79; H04L 25/49; H04L 27/20; H04L 27/04; H04L 25/4902
See application file for complete search history.

(56) References Cited

U.S. PATENT DOCUMENTS 10,637,698 B1 * 4/2020 Wang ..................... H04L 27/14

* cited by examiner

*Primary Examiner* — Lincoln D Donovan
*Assistant Examiner* — Alex W Lam
(74) *Attorney, Agent, or Firm* — Fish & Richardson P.C.

(57) ABSTRACT

The present specification provides a method for performing wireless power reception by a wireless power receiver in a wireless power transmission system, and a device using the method, the method comprising: transmitting information related to a power transfer contract to a wireless power transmitter; generating the power transfer contract with the wireless power transmitter on the basis of the information; and receiving the wireless power from the wireless power transmitter on the basis of the power transfer contract, wherein the wireless power receiver transmits the information to the wireless power transmitter on the basis of an amplitude shift keying (ASK) signal, and the ASK signal is generated on the basis of an input signal based on pulse width modulation (PWM).

8 Claims, 31 Drawing Sheets

|  | b7 | b6 | b5 | b4 | b3 | b2 | b1 | b0 |
|---|---|---|---|---|---|---|---|---|
| Byte 0 | Application Profile ||||||||
| Byte 1 | Version ||||||||
| Byte 2-N-1 | Profile-specific data ||||||||

|       | $b_7$ | $b_6$ | $b_5$ | $b_4$ | $b_3$ | $b_2$ | $b_1$ | $b_0$ |
|-------|-------|-------|-------|-------|-------|-------|-------|-------|
| $B_0$ | '00'  |       | Reference Power |||||| 
| $B_1$ | Reserved |||||||| 
| $B_2$ | ZERO | AI | Reserved | OB | ZERO | Count ||| 
| $B_3$ | Window Size |||| Window Offset |||| 
| $B_4$ | Neg | Pol | Depth || Buffer Size ||| Dup |

|     | $b_7$ | $b_6$ | $b_5$ | $b_4$ | $b_3$ | $b_2$ | $b_1$ | $b_0$ |
|-----|-------|-------|-------|-------|-------|-------|-------|-------|
| $B_0$ | Reserved | | Negotiable Load Power | | | | | |
| $B_1$ | Reserved | | Potential Load Power | | | | | |
| $B_2$ | Dup | AR | OB | Buffer Size | | | WPID | NRS |

FIG. 19
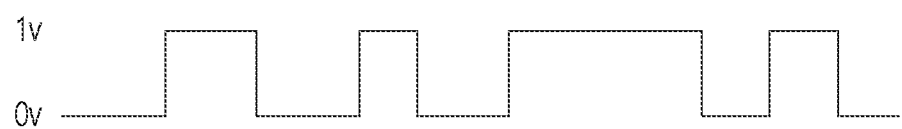
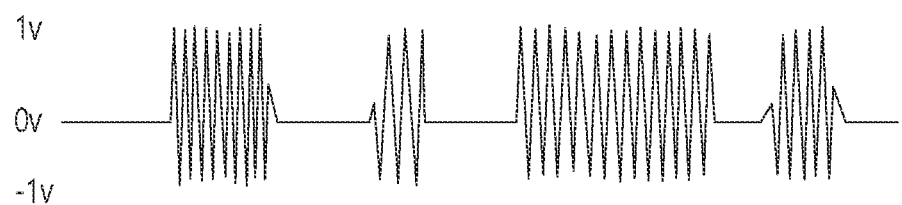

FIG. 21

| Parameter | Symbol | Value | Unit |
|---|---|---|---|
| Maximum transition time | $t_T$ | 100 | μs |
| Minimum stable time | $t_S$ | 150 | μs |
| Current amplitude variation | Δ | 8 | mA |
| Voltage amplitude variation | Δ | 110 | mV |

Amplitude shift keying (ASK)

Power fluctuation due to large depth

METHOD AND DEVICE FOR IMPROVING COMMUNICATION QUALITY ON BASIS OF PWM IN WIRELESS POWER TRANSMISSION SYSTEM

CROSS-REFERENCE TO RELATED APPLICATIONS

This application is a National Stage application under 35 U.S.C. § 371 of International Application No. PCT/KR2022/003967, filed on Mar. 22, 2022, which claims the benefit of Korean Patent Application No. 10-2021-0037522, filed on Mar. 23, 2021. The disclosures of the prior applications are incorporated by reference in their entirety.

TECHNICAL FIELD

This specification relates to wireless power transfer.

BACKGROUND

The wireless power transfer (or transmission) technology corresponds to a technology that may wirelessly transfer (or transmit) power between a power source and an electronic device. For example, by allowing the battery of a wireless device, such as a smartphone or a tablet PC, and so on, to be recharged by simply loading the wireless device on a wireless charging pad, the wireless power transfer technique may provide more outstanding mobility, convenience, and safety as compared to the conventional wired charging environment, which uses a wired charging connector. Apart from the wireless charging of wireless devices, the wireless power transfer technique is raising attention as a replacement for the conventional wired power transfer environment in diverse fields, such as electric vehicles, Bluetooth earphones, 3D glasses, diverse wearable devices, household (or home) electric appliances, furniture, underground facilities, buildings, medical equipment, robots, leisure, and so on.

The wireless power transfer (or transmission) method is also referred to as a contactless power transfer method, or a no point of contact power transfer method, or a wireless charging method. A wireless power transfer system may be configured of a wireless power transmitter supplying electric energy by using a wireless power transfer method, and a wireless power receiver receiving the electric energy being supplied by the wireless power transmitter and supplying the receiving electric energy to a receiver, such as a battery cell, and so on.

The wireless power transfer technique includes diverse methods, such as a method of transferring power by using magnetic coupling, a method of transferring power by using radio frequency (RF), a method of transferring power by using microwaves, and a method of transferring power by using ultrasound (or ultrasonic waves). The method that is based on magnetic coupling is categorized as a magnetic induction method and a magnetic resonance method. The magnetic induction method corresponds to a method transmitting power by using electric currents that are induced to the coil of the receiver by a magnetic field, which is generated from a coil battery cell of the transmitter, in accordance with an electromagnetic coupling between a transmitting coil and a receiving coil. The magnetic resonance method is similar to the magnetic induction method in that is uses a magnetic field. However, the magnetic resonance method is different from the magnetic induction method in that energy is transmitted due to a concentration of magnetic fields on both a transmitting end and a receiving end, which is caused by the generated resonance.

Meanwhile, in wireless charging, the aim is to provide a method for a wireless power receiver to control the ASK signal in high power and low power (and/or low coupling) situations, and a device using the same.

SUMMARY

According to an embodiment of the present specification, a method and apparatus, where the wireless power receiver transmits the information to the wireless power transmitter based on an amplitude shift keying (ASK) signal and the ASK signal is generated based on an input signal based on pulse width modulation (PWM), may be provided.

According to this specification, when the PWM signal is an input signal, the ASK depth can be reduced, so the fluctuation of power transmission is reduced even at high power. And communication quality can also be improved. When the PWM signal is an input signal, the ASK depth can be increased, so the shaking of power transmission can be reduced by increasing the amplitude even at low power and/or low coupling. Accordingly, the wireless power transmitter can stably decode the ASK signal, and thus the stability of ASK communication can be secured.

Effects obtainable through specific examples of the present specification are not limited to the effects listed above. For example, there may be various technical effects that a person having ordinary skill in the related art can understand or derive from this specification. Accordingly, the specific effects of the present specification are not limited to those explicitly described in the present specification, and may include various effects that can be understood or derived from the technical features of the present specification.

BRIEF DESCRIPTION OF THE DRAWINGS

FIG. 19 schematically shows an example of an ASK signal.

FIG. 21 schematically shows examples of parameters for amplitude modulation of a power signal.

MODE

In this specification, "A or B" may refer to "only A", "only B" or "both A and B". In other words, "A or B" in this specification may be interpreted as "A and/or B". For example, in this specification, "A, B, or C" may refer to "only A", "only B", "only C", or any combination of "A, B and C".

The slash (/) or comma used in this specification may refer to "and/or". For example, "A/B" may refer to "A and/or B". Accordingly, "A/B" may refer to "only A", "only B", or "both A and B". For example, "A, B, C" may refer to "A, B, or C".

In this specification, "at least one of A and B" may refer to "only A", "only B", or "both A and B". In addition, in this specification, the expression of "at least one of A or B" or "at least one of A and/or B" may be interpreted to be the same as "at least one of A and B".

Also, in this specification, "at least one of A, B and C" may refer to "only A", "only B", "only C", or "any combination of A. B and C". Also, "at least one of A, B or C" or "at least one of A, B and/or C" may refer to "at least one of A, B and C".

In addition, parentheses used in the present specification may refer to "for example". Specifically, when indicated as "control information (PDCCH)", "PDCCH" may be proposed as an example of "control information". In other words, "control information" in this specification is not limited to "PDCCH", and "PDCCH" may be proposed as an example of "control information". In addition, even when indicated as "control information (i.e., PDCCH)", "PDCCH" may be proposed as an example of "control information".

In the present specification, technical features that are individually described in one drawing may be individually or simultaneously implemented. The term "wireless power", which will hereinafter be used in this specification, will be used to refer to an arbitrary form of energy that is related to an electric field, a magnetic field, and an electromagnetic field, which is transferred (or transmitted) from a wireless power transmitter to a wireless power receiver without using any physical electromagnetic conductors. The wireless power may also be referred to as a wireless power signal, and this may refer to an oscillating magnetic flux that is enclosed by a primary coil and a secondary coil. For example, power conversion for wirelessly charging devices including mobile phones, cordless phones, iPods, MP3 players, headsets, and so on, within the system will be described in this specification. Generally, the basic principle of the wireless power transfer technique includes, for example, all of a method of transferring power by using magnetic coupling, a method of transferring power by using radio frequency (RF), a method of transferring power by using microwaves, and a method of transferring power by using ultrasound (or ultrasonic waves).

Figure 1:
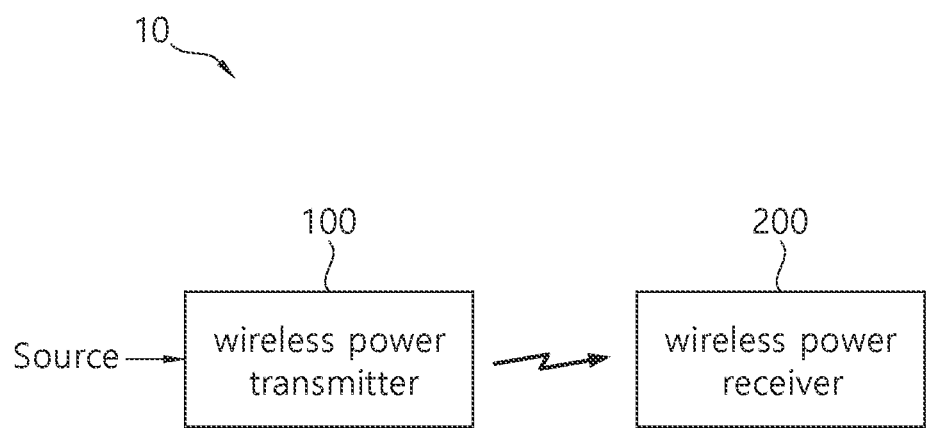
FIG. 1 is a block diagram of a wireless power system (10) according to an exemplary embodiment of the present disclosure.

FIG. 1 is a block diagram of a wireless power system (10) according to an exemplary embodiment of the present disclosure.

Referring to FIG. 1, the wireless power system (10) include a wireless power transmitter (100) and a wireless power receiver (200).

The wireless power transmitter (100) is supplied with power from an external power source (S) and generates a magnetic field. The wireless power receiver (200) generates electric currents by using the generated magnetic field, thereby being capable of wirelessly receiving power.

Additionally, in the wireless power system (10), the wireless power transmitter (100) and the wireless power receiver (200) may transceive (transmit and/or receive) diverse information that is required for the wireless power transfer. Herein, communication between the wireless power transmitter (100) and the wireless power receiver (200) may be performed (or established) in accordance with any one of an in-band communication, which uses a magnetic field that is used for the wireless power transfer (or transmission), and an out-band communication, which uses a separate communication carrier. Out-band communication may also be referred to as out-of-band communication. Hereinafter, out-band communication will be largely described. Examples of out-band communication may include NFC. Bluetooth, Bluetooth low energy (BLE), and the like.

Herein, the wireless power transmitter (100) may be provided as a fixed type or a mobile (or portable) type. Examples of the fixed transmitter type may include an embedded type, which is embedded in in-door ceilings or wall surfaces or embedded in furniture, such as tables, an implanted type, which is installed in out-door parking lots, bus stops, subway stations, and so on, or being installed in means of transportation, such as vehicles or trains. The mobile (or portable) type wireless power transmitter (100) may be implemented as a part of another device, such as a mobile device having a portable size or weight or a cover of a laptop computer, and so on.

Additionally, the wireless power receiver (200) should be interpreted as a comprehensive concept including diverse home appliances and devices that are operated by being wirelessly supplied with power instead of diverse electronic devices being equipped with a battery and a power cable. Typical examples of the wireless power receiver (200) may include portable terminals, cellular phones, smartphones, personal digital assistants (PDAs), portable media players (PDPs), Wibro terminals, tablet PCs, phablet, laptop computers, digital cameras, navigation terminals, television, electronic vehicles (EVs), and so on.

Figure 2:
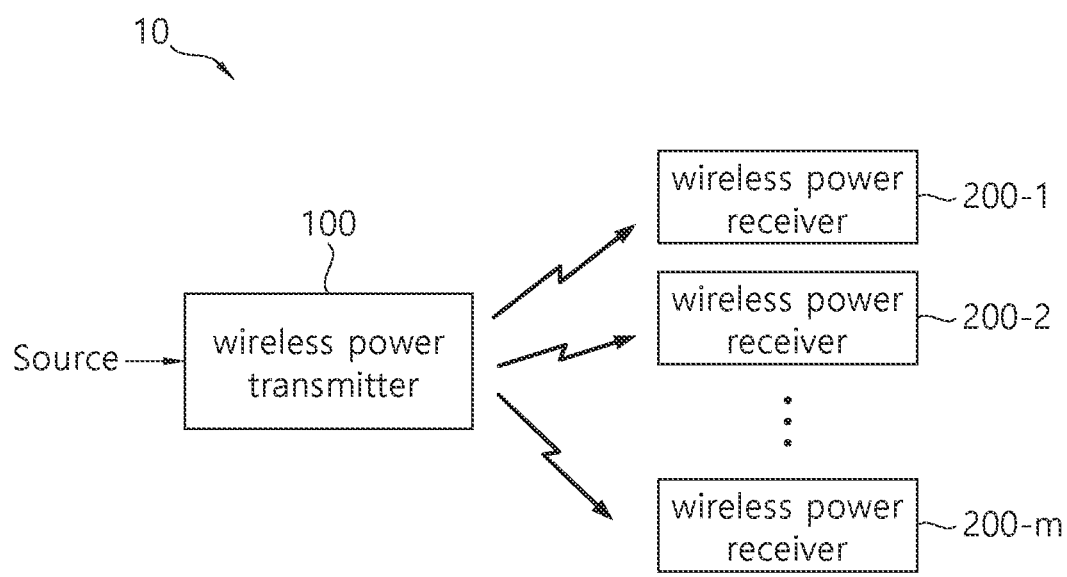
FIG. 2 is a block diagram of a wireless power system (10) according to another exemplary embodiment of the present disclosure.

FIG. 2 is a block diagram of a wireless power system (10) according to another exemplary embodiment of the present disclosure.

Referring to FIG. 2, in the wireless power system (10), one wireless power receiver (200) or a plurality of wireless power receivers may exist. Although it is shown in FIG. 1 that the wireless power transmitter (100) and the wireless power receiver (200) send and receive power to and from one another in a one-to-one correspondence (or relationship), as shown in FIG. 2, it is also possible for one wireless power transmitter (100) to simultaneously transfer power to multiple wireless power receivers (200-1, 200-2 . . . , 200-M). Most particularly, in case the wireless power transfer (or transmission) is performed by using a magnetic resonance method, one wireless power transmitter (100) may transfer power to multiple wireless power receivers (200-1, 200-2, . . . , 200-M) by using a synchronized transport (or transfer) method or a time-division transport (or transfer) method.

Additionally, although it is shown in FIG. 1 that the wireless power transmitter (100) directly transfers (or transmits) power to the wireless power receiver (200), the wireless power system (10) may also be equipped with a separate wireless power transceiver, such as a relay or repeater, for increasing a wireless power transport distance between the wireless power transmitter (100) and the wireless power receiver (200). In this case, power is delivered to the wireless power transceiver from the wireless power transmitter (100), and, then, the wireless power transceiver may transfer the received power to the wireless power receiver (200).

Hereinafter, the terms wireless power receiver, power receiver, and receiver, which are mentioned in this specification, will refer to the wireless power receiver (200). Also, the terms wireless power transmitter, power transmitter, and transmitter, which are mentioned in this specification, will refer to the wireless power transmitter (100).

Figures 3, 4:
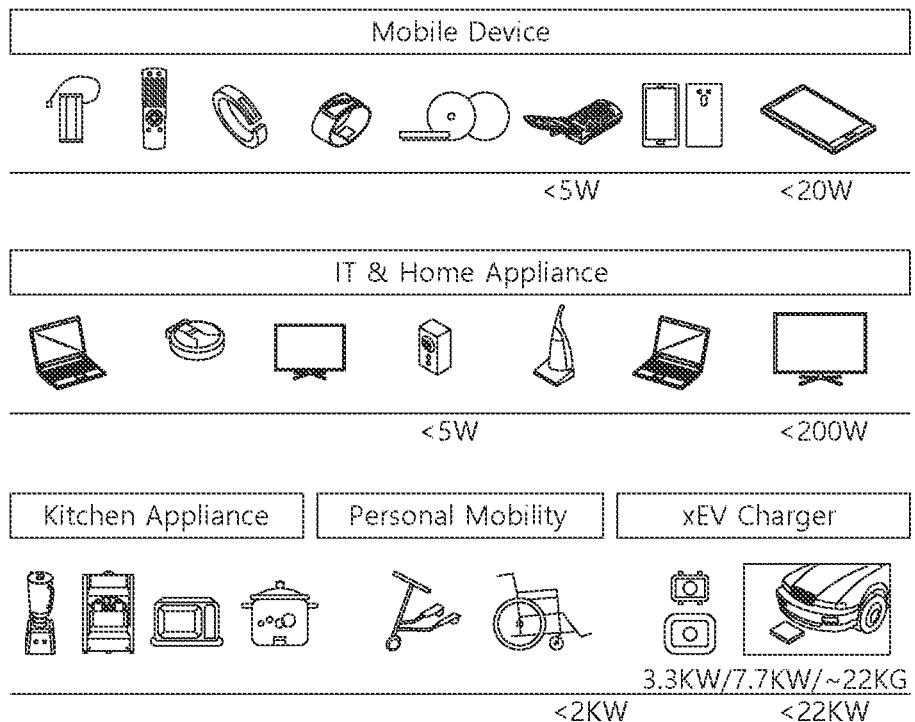
FIG. 3 shows an exemplary embodiment of diverse electronic devices adopting a wireless power transfer system.
FIG. 4 shows an example of a WPC NDEF in a wireless power transfer system.

FIG. 3 shows an exemplary embodiment of diverse electronic devices adopting a wireless power transfer system.

As shown in FIG. 3, the electronic devices included in the wireless power transfer system are sorted in accordance with the amount of transmitted power and the amount of received power. Referring to FIG. 3, wearable devices, such as smart watches, smart glasses, head mounted displays (HMDs), smart rings, and so on, and mobile electronic devices (or portable electronic devices), such as earphones, remote controllers, smartphones, PDAs, tablet PCs, and so on, may adopt a low-power (approximately 5 W or less or approximately 20 W or less) wireless charging method.

Small-sized/Mid-sized electronic devices, such as laptop computers, robot vacuum cleaners, TV receivers, audio devices, vacuum cleaners, monitors, and so on, may adopt a mid-power (approximately 50 W or less or approximately 200 W or less) wireless charging method. Kitchen appliances, such as mixers, microwave ovens, electric rice cookers, and so on, and personal transportation devices (or other electric devices or means of transportation), such as powered wheelchairs, powered kick scooters, powered bicycles, electric cars, and so on may adopt a high-power (approximately 2 kW or less or approximately 22 kW or less) wireless charging method.

The electric devices or means of transportation, which are described above (or shown in FIG. 1) may each include a wireless power receiver, which will hereinafter be described in detail. Therefore, the above-described electric devices or means of transportation may be charged (or recharged) by wirelessly receiving power from a wireless power transmitter.

Hereinafter, although the present disclosure will be described based on a mobile device adopting the wireless power charging method, this is merely exemplary. And, therefore, it shall be understood that the wireless charging method according to the present disclosure may be applied to diverse electronic devices.

A standard for the wireless power transfer (or transmission) includes a wireless power consortium (WPC), an air fuel alliance (AFA), and a power matters alliance (PMA).

The WPC standard defines a baseline power profile (BPP) and an extended power profile (EPP). The BPP is related to a wireless power transmitter and a wireless power receiver supporting a power transfer of 5 W. and the EPP is related to a wireless power transmitter and a wireless power receiver supporting the transfer of a power range greater than 5 W and less than 30 W.

Diverse wireless power transmitters and wireless power receivers each using a different power level may be covered by each standard and may be sorted by different power classes or categories.

For example, the WPC may categorize (or sort) the wireless power transmitters and the wireless power receivers as PC−1, PC0, PC1, and PC2, and the WPC may provide a standard document (or specification) for each power class (PC). The PC−1 standard relates to wireless power transmitters and receivers providing a guaranteed power of less than 5 W. The application of PC−1 includes wearable devices, such as smart watches.

The PC0 standard relates to wireless power transmitters and receivers providing a guaranteed power of 5 W. The PC0 standard includes an EPP having a guaranteed power ranges that extends to 30 W. Although in-band (IB) communication corresponds to a mandatory communication protocol of PC0, out-of-band (OB) communication that is used as an optional backup channel may also be used for PC0. The wireless power receiver may be identified by setting up an OB flag, which indicates whether or not the OB is supported, within a configuration packet. A wireless power transmitter supporting the OB may enter an OB handover phase by transmitting a bit-pattern for an OB handover as a response to the configuration packet. The response to the configuration packet may correspond to an NAK, an ND, or an 8-bit pattern that is newly defined. The application of the PC0 includes smartphones.

The PC1 standard relates to wireless power transmitters and receivers providing a guaranteed power ranging from 30 W to 150 W. OB corresponds to a mandatory communication channel for PC1, and IB is used for initialization and link establishment to OB. The wireless power transmitter may enter an OB handover phase by transmitting a bit-pattern for an OB handover as a response to the configuration packet. The application of the PC1 includes laptop computers or power tools.

The PC2 standard relates to wireless power transmitters and receivers providing a guaranteed power ranging from 200 W to 2 kW, and its application includes kitchen appliances.

As described above, the PCs may be differentiated in accordance with the respective power levels. And, information on whether or not the compatibility between the same PCs is supported may be optional or mandatory. Herein, the compatibility between the same PCs indicates that power transfer/reception between the same PCs is possible. For example, in case a wireless power transmitter corresponding to PC x is capable of performing charging of a wireless power receiver having the same PC x, it may be understood that compatibility is maintained between the same PCs. Similarly, compatibility between different PCs may also be supported. Herein, the compatibility between different PCs indicates that power transfer/reception between different PCs is also possible. For example, in case a wireless power transmitter corresponding to PC x is capable of performing charging of a wireless power receiver having PC y, it may be understood that compatibility is maintained between the different PCs.

The support of compatibility between PCs corresponds to an extremely important issue in the aspect of user experience and establishment of infrastructure. Herein, however, diverse problems, which will be described below, exist in maintaining the compatibility between PCs.

In case of the compatibility between the same PCs, for example, in case of a wireless power receiver using a lap-top charging method, wherein stable charging is possible only when power is continuously transferred, even if its respective wireless power transmitter has the same PC, it may be difficult for the corresponding wireless power receiver to stably receive power from a wireless power transmitter of the power tool method, which transfers power non-continuously. Additionally, in case of the compatibility between different PCs, for example, in case a wireless power transmitter having a minimum guaranteed power of 200 W transfers power to a wireless power receiver having a maximum guaranteed power of 5 W, the corresponding wireless power receiver may be damaged due to an overvoltage. As a result, it may be inappropriate (or difficult) to use the PS as an index/reference standard representing/indicating the compatibility.

Wireless power transmitters and receivers may provide a very convenient user experience and interface (UX/UI). That is, a smart wireless charging service may be provided, and the smart wireless charging service may be implemented based on a UX/UI of a smartphone including a wireless power transmitter. For these applications, an interface between a processor of a smartphone and a wireless charging receiver allows for "drop and play" two-way communication between the wireless power transmitter and the wireless power receiver.

Hereinafter, 'profiles' will be newly defined based on indexes/reference standards representing/indicating the compatibility. More specifically, it may be understood that by maintaining compatibility between wireless power transmitters and receivers having the same 'profile', stable power transfer/reception may be performed, and that power transfer/reception between wireless power transmitters and receivers having different 'profiles' cannot be performed. The 'profiles' may be defined in accordance with whether or not compatibility is possible and/or the application regardless of (or independent from) the power class.

For example, the profile may be sorted into 3 different categories, such as i) Mobile, ii) Power tool and iii) Kitchen.

For another example, the profile may be sorted into 4 different categories, such as i) Mobile, ii) Power tool, iii) Kitchen, and iv) Wearable.

In case of the 'Mobile' profile, the PC may be defined as PC0 and/or PC1, the communication protocol/method may be defined as IB and OB communication, and the operation frequency may be defined as 87 to 205 kHz, and smartphones, laptop computers, and so on, may exist as the exemplary application.

In case of the 'Power tool' profile, the PC may be defined as PC1, the communication protocol/method may be defined as IB communication, and the operation frequency may be defined as 87 to 145 kHz, and power tools, and so on, may exist as the exemplary application.

In case of the 'Kitchen' profile, the PC may be defined as PC2, the communication protocol/method may be defined as NFC-based communication, and the operation frequency may be defined as less than 100 kHz, and kitchen/home appliances, and so on, may exist as the exemplary application.

In the case of power tools and kitchen profiles, NFC communication may be used between the wireless power transmitter and the wireless power receiver. The wireless power transmitter and the wireless power receiver may confirm that they are NFC devices with each other by exchanging WPC NFC data exchange profile format (NDEF).

FIG. 4 shows an example of a WPC NDEF in a wireless power transfer system.

Referring to FIG. 4, the WPC NDEF may include, for example, an application profile field (e.g., IB), a version field (e.g., IB), and profile specific data (e.g., IB). The application profile field indicates whether the corresponding device is i) mobile and computing, ii) power tool, and iii) kitchen, and an upper nibble in the version field indicates a major version and a lower nibble indicates a minor version. In addition, profile-specific data defines content for the kitchen.

In case of the 'Wearable' profile, the PC may be defined as PC−1, the communication protocol/method may be defined as IB communication, and the operation frequency may be defined as 87 to 205 kHz. and wearable devices that are worn by the users, and so on, may exist as the exemplary application.

It may be mandatory to maintain compatibility between the same profiles, and it may be optional to maintain compatibility between different profiles.

The above-described profiles (Mobile profile, Power tool profile, Kitchen profile, and Wearable profile) may be generalized and expressed as first to nth profile, and a new profile may be added/replaced in accordance with the WPC standard and the exemplary embodiment.

In case the profile is defined as described above, the wireless power transmitter may optionally perform power transfer only to the wireless power receiving corresponding to the same profile as the wireless power transmitter, thereby being capable of performing a more stable power transfer. Additionally, since the load (or burden) of the wireless power transmitter may be reduced and power transfer is not attempted to a wireless power receiver for which compatibility is not possible, the risk of damage in the wireless power receiver may be reduced.

PC of the 'Mobile' profile may be defined by being derived from an optional extension such as OB, based on PC0. And, the 'Power tool' profile may be defined as a simply modified version of the PC1 ' Mobile' profile. Additionally, up until now, although the profiles have been defined for the purpose of maintaining compatibility between the same profiles, in the future, the technology may be evolved to a level of maintaining compatibility between different profiles. The wireless power transmitter or the wireless power receiver may notify (or announce) its profile to its counterpart by using diverse methods.

In the AFA standard, the wireless power transmitter is referred to as a power transmitting unit (PTU), and the wireless power receiver is referred to as a power receiving unit (PRU). And, the PTU is categorized to multiple classes, as shown in Table 1, and the PRU is categorized to multiple classes, as shown in Table 2.

TABLE 1

| PTU | $P_{TX\_IN\_MAX}$ | Minimum category support requirement | Minimum value for a maximum number of supported devices |
|---|---|---|---|
| Class 1 | 2 W | 1x Category 1 | 1x Category 1 |
| Class 2 | 10 W | 1x Category 3 | 2x Category 2 |
| Class 3 | 16 W | 1x Category 4 | 2x Category 3 |
| Class 4 | 33 W | 1x Category 5 | 3x Category 3 |
| Class 5 | 50 W | 1x Category 6 | 4x Category 3 |
| Class 6 | 70 W | 1x Category 7 | 5x Category 3 |

TABLE 2

| PRU | $P_{RX\_OUT\_MAX}$ | Exemplary application |
|---|---|---|
| Category 1 | TBD | Bluetooth headset |
| Category 2 | 3.5 W | Feature phone |
| Category 3 | 6.5 W | Smartphone |
| Category 4 | 13 W | Tablet PC, Phablet |
| Category 5 | 25 W | Small form factor laptop |
| Category 6 | 37.5 W | General laptop |
| Category 7 | 50 W | Home appliance |

Figure 5:
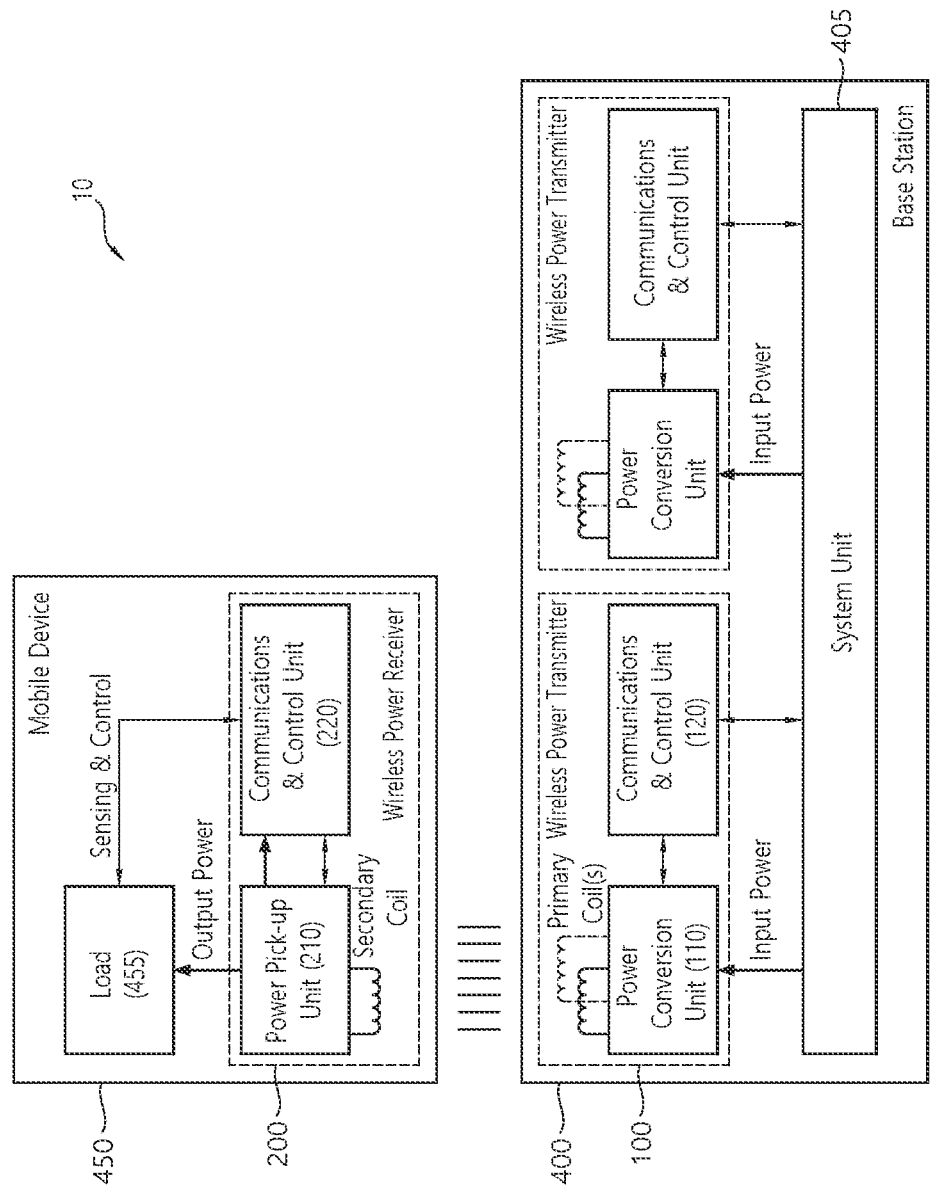
FIG. 5 is a block diagram of a wireless power transfer system according to another exemplary embodiment of the present disclosure.

As shown in Table 1, a maximum output power capability of Class n PTU may be equal to or greater than the $P_{TX\_IN\_MAX}$ of the corresponding class. The PRU cannot draw a power that is higher than the power level specified in the corresponding category. FIG. 5 is a block diagram of a wireless power transfer system according to another exemplary embodiment of the present disclosure. Referring to FIG. 5, the wireless power transfer system (10) includes a mobile device (450), which wirelessly receives power, and a base station (400), which wirelessly transmits power.

As a device providing induction power or resonance power, the base station (400) may include at least one of a wireless power transmitter (100) and a system unit (405). The wireless power transmitter (100) may transmit induction power or resonance power and may control the transmission. The wireless power transmitter (100) may include a power conversion unit (110) converting electric energy to a power signal by generating a magnetic field through a primary coil (or primary coils), and a communications & control unit (120) controlling the communication and power transfer between the wireless power receiver (200) in order to transfer power at an appropriate (or suitable) level. The system unit (405) may perform input power provisioning, controlling of multiple wireless power transmitters, and other operation controls of the base station (400), such as user interface control.

The primary coil may generate an electromagnetic field by using an alternating current power (or voltage or current). The primary coil is supplied with an alternating current power (or voltage or current) of a specific frequency, which is being outputted from the power conversion unit (110). And, accordingly, the primary coil may generate a magnetic field of the specific frequency. The magnetic field may be generated in a non-radial shape or a radial shape. And, the wireless power receiver (200) receives the generated magnetic field and then generates an electric current. In other words, the primary coil wirelessly transmits power.

In the magnetic induction method, a primary coil and a secondary coil may have randomly appropriate shapes. For example, the primary coil and the secondary coil may correspond to copper wire being wound around a high-permeability formation, such as ferrite or a non-crystalline metal. The primary coil may also be referred to as a transmitting coil, a primary core, a primary winding, a primary loop antenna, and so on. Meanwhile, the secondary coil may also be referred to as a receiving coil, a secondary core, a secondary winding, a secondary loop antenna, a pickup antenna, and so on.

In case of using the magnetic resonance method, the primary coil and the secondary coil may each be provided in the form of a primary resonance antenna and a secondary resonance antenna. The resonance antenna may have a resonance structure including a coil and a capacitor. At this point, the resonance frequency of the resonance antenna may be determined by the inductance of the coil and a capacitance of the capacitor. Herein, the coil may be formed to have a loop shape. And, a core may be placed inside the loop. The core may include a physical core, such as a ferrite core, or an air core.

The energy transmission (or transfer) between the primary resonance antenna and the second resonance antenna may be performed by a resonance phenomenon occurring in the magnetic field. When a near field corresponding to a resonance frequency occurs in a resonance antenna, and in case another resonance antenna exists near the corresponding resonance antenna, the resonance phenomenon refers to a highly efficient energy transfer occurring between the two resonance antennas that are coupled with one another. When a magnetic field corresponding to the resonance frequency is generated between the primary resonance antenna and the secondary resonance antenna, the primary resonance antenna and the secondary resonance antenna resonate with one another. And, accordingly, in a general case, the magnetic field is focused toward the second resonance antenna at a higher efficiency as compared to a case where the magnetic field that is generated from the primary antenna is radiated to a free space. And, therefore, energy may be transferred to the second resonance antenna from the first resonance antenna at a high efficiency. The magnetic induction method may be implemented similarly to the magnetic resonance method. However, in this case, the frequency of the magnetic field is not required to be a resonance frequency. Nevertheless, in the magnetic induction method, the loops configuring the primary coil and the secondary coil are required to match one another, and the distance between the loops should be very close-ranged.

Although it is not shown in the drawing, the wireless power transmitter (100) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (120) may transmit and/or receive information to and from the wireless power receiver (200). The communications & control unit (120) may include at least one of an IB communication module and an OB communication module.

The IB communication module may transmit and/or receive information by using a magnetic wave, which uses a specific frequency as its center frequency. For example, the communications & control unit (120) may perform in-band (IB) communication by transmitting communication information on the operating frequency of wireless power transfer through the primary coil or by receiving communication information on the operating frequency through the primary coil. At this point, the communications & control unit (120) may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (120) may transmit and/or receive information to distances of up to several meters at a data transmission rate of several kbps.

The OB communication module may also perform out-of-band communication through a communication antenna. For example, the communications & control unit (120) may be provided to a near field communication module. Examples of the near field communication module may include communication modules, such as Wi-Fi. Bluetooth, Bluetooth LE, ZigBee, NFC, and so on.

The communications & control unit (120) may control the overall operations of the wireless power transmitter (100). The communications & control unit (120) may perform calculation and processing of diverse information and may also control each configuration element of the wireless power transmitter (100).

The communications & control unit (120) may be implemented in a computer or a similar device as hardware, software, or a combination of the same. When implemented in the form of hardware, the communications & control unit (120) may be provided as an electronic circuit performing control functions by processing electrical signals. And, when implemented in the form of software, the communications & control unit (120) may be provided as a program that operates the communications & control unit (120).

By controlling the operating point, the communications & control unit (120) may control the transmitted power. The operating point that is being controlled may correspond to a combination of a frequency (or phase), a duty cycle, a duty ratio, and a voltage amplitude. The communications & control unit (120) may control the transmitted power by adjusting any one of the frequency (or phase), the duty cycle, the duty ratio, and the voltage amplitude. Additionally, the wireless power transmitter (100) may supply a consistent level of power, and the wireless power receiver (200) may control the level of received power by controlling the resonance frequency.

The mobile device (450) includes a wireless power receiver (200) receiving wireless power through a secondary coil, and a load (455) receiving and storing the power that is received by the wireless power receiver (200) and supplying the received power to the device.

The wireless power receiver (200) may include a power pick-up unit (210) and a communications & control unit (220). The power pick-up unit (210) may receive wireless power through the secondary coil and may convert the received wireless power to electric energy. The power pick-up unit (210) rectifies the alternating current (AC) signal, which is received through the secondary coil, and converts the rectified signal to a direct current (DC) signal. The communications & control unit (220) may control the transmission and reception of the wireless power (transfer and reception of power).

The secondary coil may receive wireless power that is being transmitted from the wireless power transmitter (100). The secondary coil may receive power by using the magnetic field that is generated in the primary coil. Herein, in case the specific frequency corresponds a resonance frequency, magnetic resonance may occur between the primary coil and the secondary coil, thereby allowing power to be transferred with greater efficiency.

Although it is not shown in FIG. 5, the communications & control unit (220) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (220) may transmit and/or receive information to and from the wireless power transmitter (100). The communications & control unit (220) may include at least one of an IB communication module and an OB communication module.

The IB communication module may transmit and/or receive information by using a magnetic wave, which uses a specific frequency as its center frequency. For example, the communications & control unit (220) may perform IB communication by loading information in the magnetic wave and by transmitting the information through the secondary coil or by receiving a magnetic wave carrying information through the secondary coil. At this point, the communications & control unit (120) may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (220) may transmit and/or receive information to distances of up to several meters at a data transmission rate of several kbps.

The OB communication module may also perform out-of-band communication through a communication antenna.

For example, the communications & control unit (220) may be provided to a near field communication module.

Examples of the near field communication module may include communication modules, such as Wi-Fi, Bluetooth, Bluetooth LE, ZigBee, NFC, and so on.

The communications & control unit (220) may control the overall operations of the wireless power receiver (200). The communications & control unit (220) may perform calculation and processing of diverse information and may also control each configuration element of the wireless power receiver (200).

The communications & control unit (220) may be implemented in a computer or a similar device as hardware, software, or a combination of the same. When implemented in the form of hardware, the communications & control unit (220) may be provided as an electronic circuit performing control functions by processing electrical signals. And, when implemented in the form of software, the communications & control unit (220) may be provided as a program that operates the communications & control unit (220).

Figure 6:
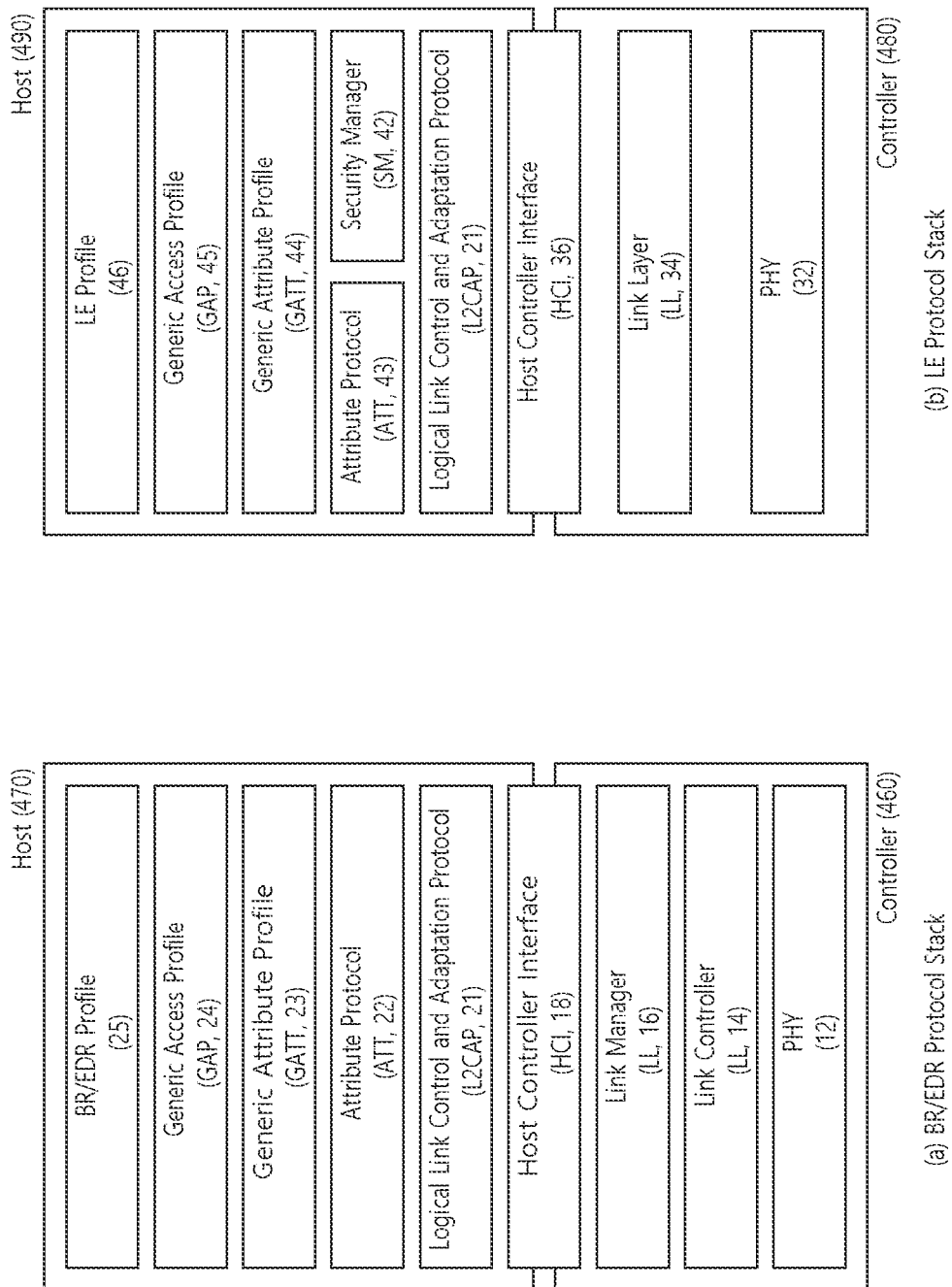
FIG. 6 is a diagram illustrating an example of a Bluetooth communication architecture to which an embodiment according to the present disclosure may be applied.

When the communication/control circuit 120 and the communication/control circuit 220 are Bluetooth or Bluetooth LE as an OB communication module or a short-range communication module, the communication/control circuit 120 and the communication/control circuit 220 may each be implemented and operated with a communication architecture as shown in FIG. 6.

FIG. 6 is a diagram illustrating an example of a Bluetooth communication architecture to which an embodiment according to the present disclosure may be applied.

Referring to FIG. 6, (a) of FIG. 6 shows an example of a protocol stack of Bluetooth basic rate (BR)/enhanced data rate (EDR) supporting GATT, and (b) shows an example of Bluetooth low energy (BLE) protocol stack.

Specifically, as shown in (a) of FIG. 6, the Bluetooth BR/EDR protocol stack may include an upper control stack 460 and a lower host stack 470 based on a host controller interface (HCI) 18.

The host stack (or host module) 470 refers to hardware for transmitting or receiving a Bluetooth packet to or from a wireless transmission/reception module which receives a Bluetooth signal of 2.4 GHz, and the controller stack 460 is connected to the Bluetooth module to control the Bluetooth module and perform an operation.

The host stack 470 may include a BR/EDR PHY layer 12, a BREDR baseband layer 14, and a link manager layer 16.

The BR/EDR PHY layer 12 is a layer that transmits and receives a 2.4 GHz radio signal, and in the case of using Gaussian frequency shift keying (GFSK) modulation, the BR/EDR PHY layer 12 may transmit data by hopping 79 RF channels.

The BR/EDR baseband layer 14 serves to transmit a digital signal, selects a channel sequence for hopping 1400 times per second, and transmits a time slot with a length of 625 us for each channel.

The link manager layer 16 controls an overall operation (link setup, control, security) of Bluetooth connection by utilizing a link manager protocol (LMP).

The link manager layer 16 may perform the following functions.

Performs ACL/SCO logical transport, logical link setup, and control.

Detach: It interrupts connection and informs a counterpart device about a reason for the interruption.

Performs power control and role switch.

Performs security (authentication, pairing, encryption) function.

The host controller interface layer 18 provides an interface between a host module and a controller module so that a host provides commands and data to the controller and the controller provides events and data to the host.

The host stack (or host module, 470) includes a logical link control and adaptation protocol (L2CAP) 21, an attribute protocol 22, a generic attribute profile (GATT) 23, a generic access profile (GAP) 24, and a BR/EDR profile 25.

The logical link control and adaptation protocol (L2CAP) 21 may provide one bidirectional channel for transmitting data to a specific protocol or profile.

The L2CAP 21 may multiplex various protocols, profiles, etc., provided from upper Bluetooth.

L2CAP of Bluetooth BR/EDR uses dynamic channels, supports protocol service multiplexer, retransmission, streaming mode, and provides segmentation and reassembly, per-channel flow control, and error control.

The generic attribute profile (GATT) 23 may be operable as a protocol that describes how the attribute protocol 22 is used when services are configured. For example, the generic attribute profile 23 may be operable to specify how ATT attributes are grouped together into services and may be operable to describe features associated with services.

Accordingly, the generic attribute profile 23 and the attribute protocols (ATT) 22 may use features to describe device's state and services, how features are related to each other, and how they are used.

The attribute protocol 22 and the BR/EDR profile 25 define a service (profile) using Bluetooth BR/EDR and an application protocol for exchanging these data, and the generic access profile (GAP) 24 defines device discovery, connectivity, and security level.

As shown in (b) of FIG. 6, the Bluetooth LE protocol stack includes a controller stack 480 operable to process a wireless device interface important in timing and a host stack 490 operable to process high level data.

First, the controller stack 480 may be implemented using a communication module that may include a Bluetooth wireless device, for example, a processor module that may include a processing device such as a microprocessor.

The host stack 490 may be implemented as apart of an OS running on a processor module or as an instantiation of a package on the OS.

In some cases, the controller stack and the host stack may be run or executed on the same processing device in a processor module.

The controller stack 480 includes a physical layer (PHY) 32, a link layer 34, and a host controller interface 36.

The physical layer (PHY, wireless transmission/reception module) 32 is a layer that transmits and receives a 2.4 GHz radio signal and uses Gaussian frequency shift keying (GFSK) modulation and a frequency hopping scheme including 40 RF channels.

The link layer 34, which serves to transmit or receive Bluetooth packets, creates connections between devices after performing advertising and scanning functions using 3 advertising channels and provides a function of exchanging data packets of up to 257 bytes through 37 data channels.

The host stack includes a generic access profile (GAP) 45, a logical link control and adaptation protocol (L2CAP, 41), a security manager (SM) 42, and an attribute protocol (ATT) 43, a generic attribute profile (GATT) 44, a generic access profile 45, and an LE profile 46. However, the host stack 490 is not limited thereto and may include various protocols and profiles.

The host stack multiplexes various protocols, profiles, etc., provided from upper Bluetooth using L2CAP.

First, the logical link control and adaptation protocol (L2CAP) 41 may provide one bidirectional channel for transmitting data to a specific protocol or profile.

The L2CAP 41 may be operable to multiplex data between higher layer protocols, segment and reassemble packages, and manage multicast data transmission.

In Bluetooth LE, three fixed channels (one for signaling CH, one for security manager, and one for attribute protocol) are basically used. Also, a dynamic channel may be used as needed.

Meanwhile, a basic channel/enhanced data rate (BR/EDR) uses a dynamic channel and supports protocol service multiplexer, retransmission, streaming mode, and the like.

The security manager (SM) 42 is a protocol for authenticating devices and providing key distribution.

The attribute protocol (ATT) 43 defines a rule for accessing data of a counterpart device in a server-client structure. The ATT has the following 6 message types (request, response, command, notification, indication, confirmation).

① Request and Response message: A request message is a message for requesting specific information from the client device to the server device, and the response message is a response message to the request message, which is a message transmitted from the server device to the client device.

② Command message: It is a message transmitted from the client device to the server device in order to indicate a command of a specific operation. The server device does not transmit a response with respect to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

In the present disclosure, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data ②; Include: It defines a relationship between services ③ Characteristics: It is a data value used in a server ④ Behavior: It is a format that may be read by a computer defined by a UUID (value type).

The LE profile 46, including profiles dependent upon the GATT, is mainly applied to a Bluetooth LE device. The LE profile 46 may include, for example, Battery, Time, FindMe, Proximity. Time, Object Delivery Service, and the like, and details of the GATT-based profiles are as follows.

① Battery: Battery information exchanging method

② Time: Time information exchanging method

③ FindMe: Provision of alarm service according to distance

④ Proximity: Battery information exchanging method

⑤ Time: Time information exchanging method

The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Hereinafter, procedures of the Bluetooth low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertising event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertising procedure to perform undirected broadcast to devices within a region.

Here, the undirected broadcast is advertising toward all the devices, rather than broadcast toward a specific device, and all the devices may scan advertising to make an supplemental information request or a connection request.

In contrast, directed advertising may make an supplemental information request or a connection request by scanning advertising for only a device designated as a reception device.

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertising events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related supplemental information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 3 below.

TABLE 3

| PDU Type | Packet Name |
| --- | --- |
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event. ADV_IND: Connectable undirected advertising event
 ADV_DIRECT_IND: Connectable directed advertising event
 ADV_NONCONN_IND: Unconnectable undirected advertising event
 ADV_SCAN_IND: Scannable undirected advertising event The PDUs are transmitted from the LL in an advertising state, and received by the LL in a scanning state or in an initiating state.

Scanning PDU

The following advertising channel DPU types are termed scanning PDUs and are used in a state described hereinafter.
 SCAN_REQ: Transmitted by the LL in a scanning state and received by the LL in an advertising state.
 SCAN_RSP: Transmitted by the LL in the advertising state and received by the LL in the scanning state.

Initiating PDU

The following advertising channel PDU type is termed an initiating PDU.
 CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in the present disclosure.

Referring to FIG. 5, the load (455) may correspond to a battery. The battery may store energy by using the power that is being outputted from the power pick-up unit (210). Meanwhile, the battery is not mandatorily required to be included in the mobile device (450). For example, the battery may be provided as a detachable external feature. As another example, the wireless power receiver may include an operating means that may execute diverse functions of the electronic device instead of the battery.

As shown in the drawing, although the mobile device (450) is illustrated to be included in the wireless power receiver (200) and the base station (400) is illustrated to be included in the wireless power transmitter (100), in a broader meaning, the wireless power receiver (200) may be identified (or regarded) as the mobile device (450), and the wireless power transmitter (100) may be identified (or regarded) as the base station (400).

Figure 7:
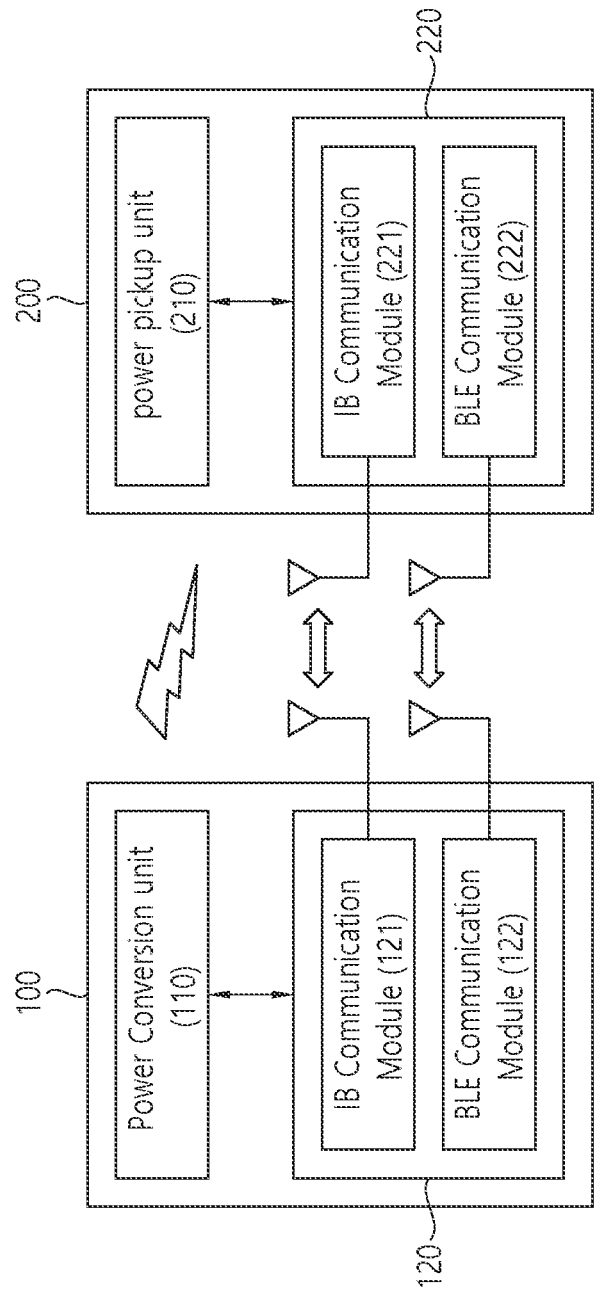
FIG. 7 is a block diagram illustrating a wireless power transfer system using BLE communication according to an example.

When the communication/control circuit 120 and the communication/control circuit 220 include Bluetooth or Bluetooth LE as an OB communication module or a short-range communication module in addition to the IB communication module, the wireless power transmitter 100 including the communication/control circuit 120 and the wireless power receiver 200 including the communication/control circuit 220 may be represented by a simplified block diagram as shown in FIG. 7.

FIG. 7 is a block diagram illustrating a wireless power transfer system using BLE communication according to an example.

Referring to FIG. 7, the wireless power transmitter 100 includes a power conversion circuit 110 and a communication/control circuit 120. The communication/control circuit 120 includes an in-band communication module 121 and a BLE communication module 122.

Meanwhile, the wireless power receiver 200 includes a power pickup circuit 210 and a communication/control circuit 220. The communication/control circuit 220 includes an in-band communication module 221 and a BLE communication module 222.

In one aspect, the BLE communication modules 122 and 222 perform the architecture and operation according to FIG. 6. For example, the BLE communication modules 122 and 222 may be used to establish a connection between the wireless power transmitter 100 and the wireless power receiver 200 and exchange control information and packets necessary for wireless power transfer.

In another aspect, the communication/control circuit 120 may be configured to operate a profile for wireless charging. Here, the profile for wireless charging may be GATT using BLE transmission.

Figure 8:
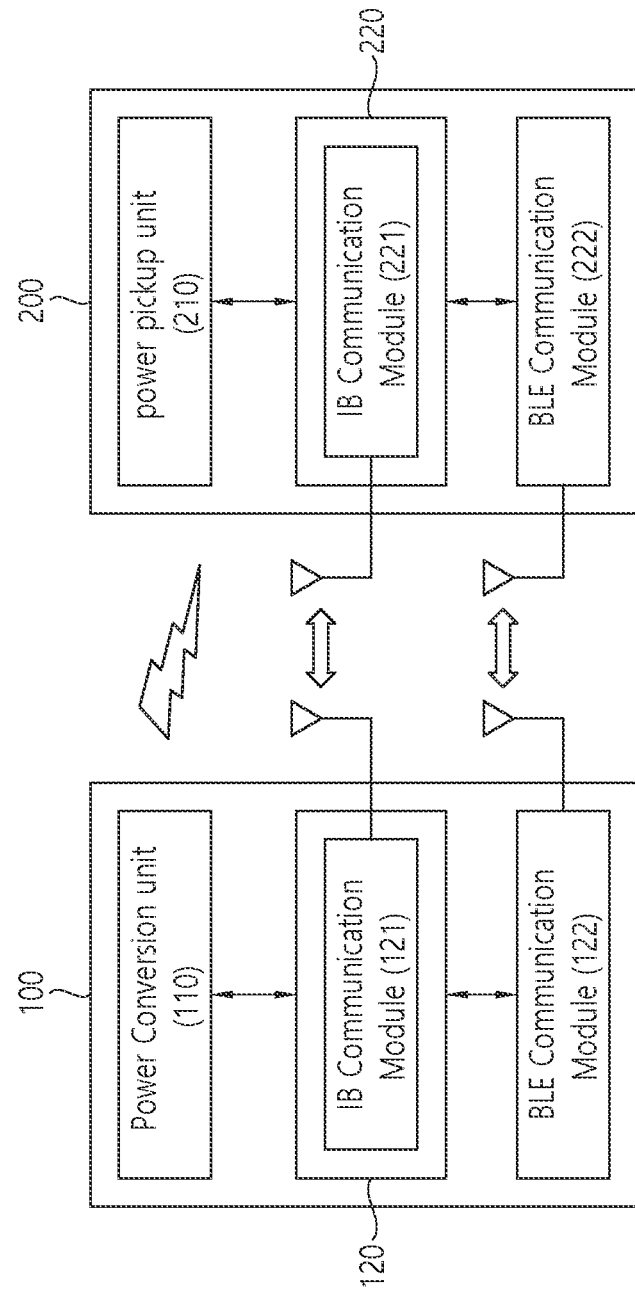
FIG. 8 is a block diagram illustrating a wireless power transfer system using BLE communication according to another example.

FIG. 8 is a block diagram illustrating a wireless power transfer system using BLE communication according to another example.

Referring to FIG. 8, the communication/control circuits 120 and 220 respectively include only in-band communication modules 121 and 221, and the BLE communication modules 122 and 222 may be provided to be separated from the communication/control circuits 120 and 220.

Hereinafter, the coil or coil unit includes a coil and at least one device being approximate to the coil, and the coil or coil unit may also be referred to as a coil assembly, a coil cell, or a cell.

Figure 9:
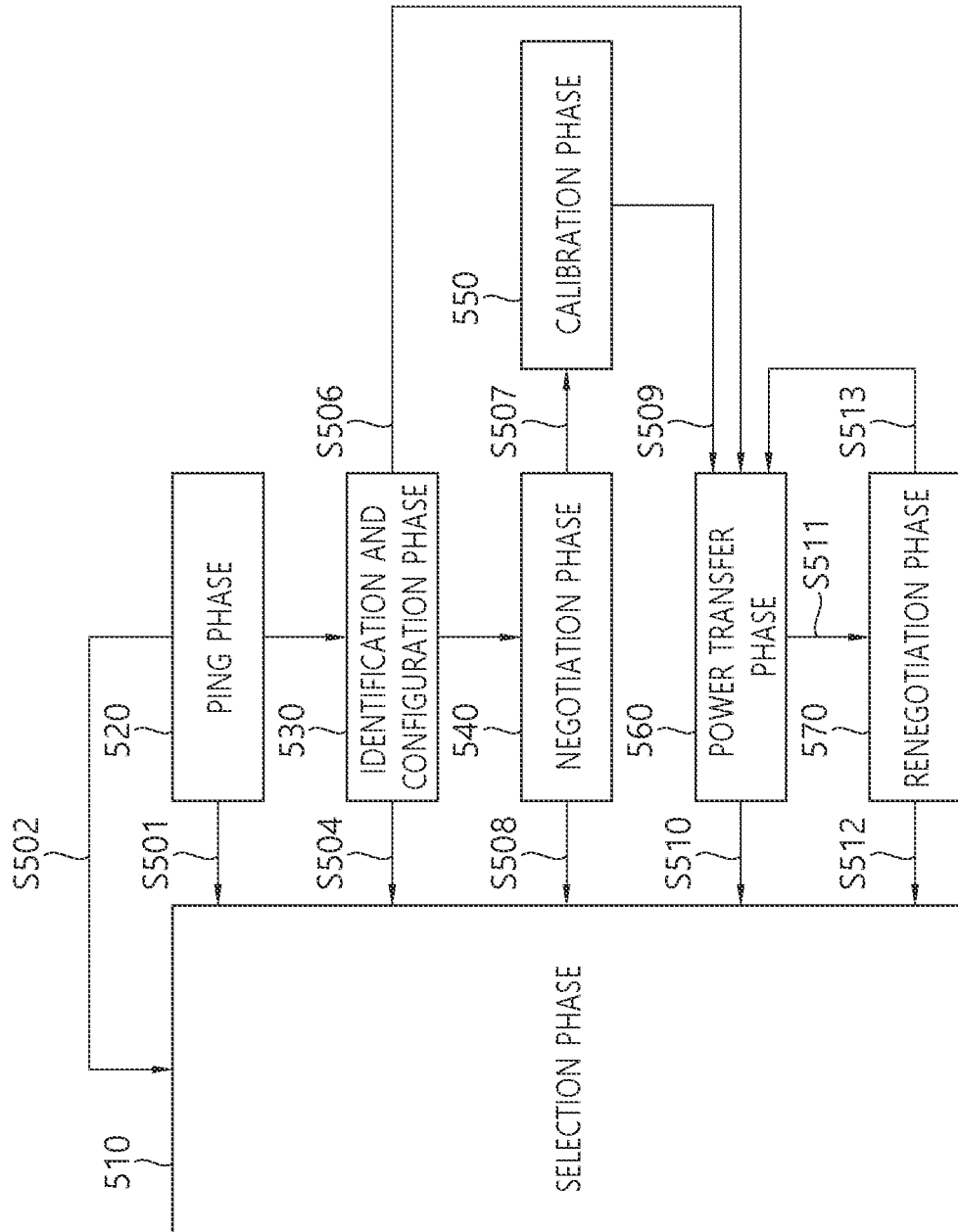
FIG. 9 is a state transition diagram for describing a wireless power transfer procedure.

FIG. 9 is a state transition diagram for describing a wireless power transfer procedure.

Referring to FIG. 9, the power transfer (or transfer) from the wireless power transmitter to the wireless power receiver according to an exemplary embodiment of the present disclosure may be broadly divided into a selection phase (510), a ping phase (520), an identification and configuration phase (530), a negotiation phase (540), a calibration phase (550), a power transfer phase (560), and a renegotiation phase (570).

If a specific error or a specific event is detected when the power transfer is initiated or while maintaining the power transfer, the selection phase (510) may include a shifting phase (or step)—reference numerals S502, S504, S508, S510, and S512. Herein, the specific error or specific event will be specified in the following description. Additionally, during the selection phase (510), the wireless power transmitter may monitor whether or not an object exists on an interface surface. If the wireless power transmitter detects that an object is placed on the interface surface, the process step may be shifted to the ping phase (520). During the selection phase (510), the wireless power transmitter may transmit an analog ping having a power signal (or a pulse) corresponding to an extremely short duration, and may detect whether or not an object exists within an active area of the interface surface based on a current change in the transmitting coil or the primary coil.

In case an object is sensed (or detected) in the selection phase (510), the wireless power transmitter may measure a quality factor of a wireless power resonance circuit (e.g., power transfer coil and/or resonance capacitor). According to the exemplary embodiment of the present disclosure, during the selection phase (510), the wireless power transmitter may measure the quality factor in order to determine whether or not a foreign object exists in the charging area along with the wireless power receiver. In the coil that is provided in the wireless power transmitter, inductance and/or components of the series resistance may be reduced due to a change in the environment, and, due to such decrease, a value of the quality factor may also be decreased. In order to determine the presence or absence of a foreign object by using the measured quality factor value, the wireless power transmitter may receive from the wireless power receiver a reference quality factor value, which is measured in advance in a state where no foreign object is placed within the charging area. The wireless power transmitter may determine the presence or absence of a foreign object by comparing the measured quality factor value with the reference quality factor value, which is received during the negotiation phase (540). However, in case of a wireless power receiver having a low reference quality factor value—e.g., depending upon its type, purpose, characteristics, and so on, the wireless power receiver may have a low reference quality factor value—in case a foreign object exists, since the difference between the reference quality factor value and the measured quality factor value is small (or insignificant), a problem may occur in that the presence of the foreign object cannot be easily determined. Accordingly, in this case, other determination factors should be further considered, or the present or absence of a foreign object should be determined by using another method.

According to another exemplary embodiment of the present disclosure, in case an object is sensed (or detected) in the selection phase (510), in order to determine whether or not a foreign object exists in the charging area along with the wireless power receiver, the wireless power transmitter may measure the quality factor value within a specific frequency area (e.g., operation frequency area). In the coil that is provided in the wireless power transmitter, inductance and/or components of the series resistance may be reduced due to a change in the environment, and, due to such decrease, the resonance frequency of the coil of the wireless power transmitter may be changed (or shifted). More specifically, a quality factor peak frequency that corresponds to a frequency in which a maximum quality factor value is measured within the operation frequency band may be moved (or shifted).

In the ping phase (520), if the wireless power transmitter detects the presence of an object, the transmitter activates (or Wakes up) a receiver and transmits a digital ping for identifying whether or not the detected object corresponds to the wireless power receiver. During the ping phase (520), if the wireless power transmitter fails to receive a response signal for the digital ping—e.g., a signal intensity packet—from the receiver, the process may be shifted back to the selection phase (510). Additionally, in the ping phase (520), if the wireless power transmitter receives a signal indicating the completion of the power transfer—e.g., charging complete packet—from the receiver, the process may be shifted back to the selection phase (510).

If the ping phase (520) is completed, the wireless power transmitter may shift to the identification and configuration phase (530) for identifying the receiver and for collecting configuration and status information.

In the identification and configuration phase (530), if the wireless power transmitter receives an unwanted packet (i.e., unexpected packet), or if the wireless power transmitter fails to receive a packet during a predetermined period of time (i.e., out of time), or if a packet transmission error occurs (i.e., transmission error), or if a power transfer contract is not configured (i.e., no power transfer contract), the wireless power transmitter may shift to the selection phase (510).

The wireless power transmitter may confirm (or verify) whether or not its entry to the negotiation phase (540) is needed based on a Negotiation field value of the configuration packet, which is received during the identification and configuration phase (530). Based on the verified result, in case a negotiation is needed, the wireless power transmitter enters the negotiation phase (540) and may then perform a predetermined FOD detection procedure. Conversely, in case a negotiation is not needed, the wireless power transmitter may immediately enter the power transfer phase (560).

In the negotiation phase (540), the wireless power transmitter may receive a Foreign Object Detection (FOD) status packet that includes a reference quality factor value. Or, the wireless power transmitter may receive an FOD status packet that includes a reference peak frequency value. Alternatively, the wireless power transmitter may receive a status packet that includes a reference quality factor value and a reference peak frequency value. At this point, the wireless power transmitter may determine a quality coefficient threshold value for FO detection based on the reference quality factor value. The wireless power transmitter may determine a peak frequency threshold value for FO detection based on the reference peak frequency value.

The wireless power transmitter may detect the presence or absence of an FO in the charging area by using the determined quality coefficient threshold value for FO detection and the currently measured quality factor value (i.e., the quality factor value that was measured before the ping phase), and, then, the wireless power transmitter may control the transmitted power in accordance with the FO detection result. For example, in case the FO is detected, the power transfer may be stopped. However, the present disclosure will not be limited only to this.

The wireless power transmitter may detect the presence or absence of an FO in the charging area by using the determined peak frequency threshold value for FO detection and the currently measured peak frequency value (i.e., the peak frequency value that was measured before the ping phase), and, then, the wireless power transmitter may control the transmitted power in accordance with the FO detection result. For example, in case the FO is detected, the power transfer may be stopped. However, the present disclosure will not be limited only to this.

In case the FO is detected, the wireless power transmitter may return to the selection phase (510). Conversely, in case the FO is not detected, the wireless power transmitter may proceed to the calibration phase (550) and may, then, enter the power transfer phase (560). More specifically, in case the FO is not detected, the wireless power transmitter may determine the intensity of the received power that is received by the receiving end during the calibration phase (550) and may measure power loss in the receiving end and the transmitting end in order to determine the intensity of the power that is transmitted from the transmitting end. In other words, during the calibration phase (550), the wireless power transmitter may estimate the power loss based on a difference between the transmitted power of the transmitting end and the received power of the receiving end. The wireless power transmitter according to the exemplary embodiment of the present disclosure may calibrate the threshold value for the FOD detection by applying the estimated power loss.

In the power transfer phase (560), in case the wireless power transmitter receives an unwanted packet (i.e., unexpected packet), or in case the wireless power transmitter fails to receive a packet during a predetermined period of time (i.e., time-out), or in case a violation of a predetermined power transfer contract occurs (i.e., power transfer contract violation), or in case charging is completed, the wireless power transmitter may shift to the selection phase (510).

Additionally, in the power transfer phase (560), in case the wireless power transmitter is required to reconfigure the power transfer contract in accordance with a status change in the wireless power transmitter, the wireless power transmitter may shift to the renegotiation phase (570). At this point, if the renegotiation is successfully completed, the wireless power transmitter may return to the power transfer phase (560).

In this embodiment, the calibration step 550 and the power transfer phase 560 are divided into separate steps, but the calibration step 550 may be integrated into the power transfer phase 560. In this case, operations in the calibration step 550 may be performed in the power transfer phase 560.

The above-described power transfer contract may be configured based on the status and characteristic information of the wireless power transmitter and receiver. For example, the wireless power transmitter status information may include information on a maximum amount of transmittable power, information on a maximum number of receivers that may be accommodated, and so on. And, the receiver status information may include information on the required power, and so on.

Figure 10:
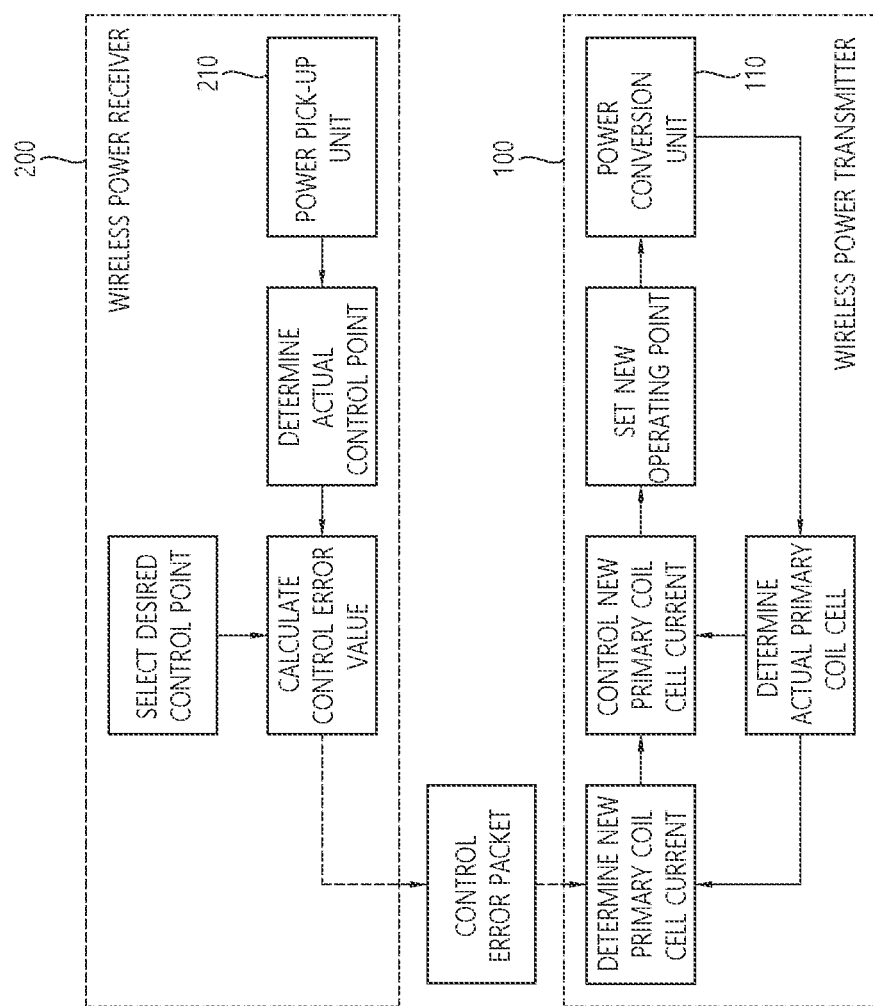
FIG. 10 shows a power control method according to an exemplary embodiment of the present disclosure.

FIG. 10 shows a power control method according to an exemplary embodiment of the present disclosure.

As shown in FIG. 10, in the power transfer phase (560), by alternating the power transfer and/or reception and communication, the wireless power transmitter (100) and the wireless power receiver (200) may control the amount (or size) of the power that is being transferred. The wireless power transmitter and the wireless power receiver operate at a specific control point. The control point indicates a combination of the voltage and the electric current that are provided from the output of the wireless power receiver, when the power transfer is performed.

More specifically, the wireless power receiver selects a desired control point, a desired output current/voltage, a temperature at a specific location of the mobile device, and so on, and additionally determines an actual control point at which the receiver is currently operating. The wireless power receiver calculates a control error value by using the desired control point and the actual control point, and, then, the wireless power receiver may transmit the calculated control error value to the wireless power transmitter as a control error packet.

Also, the wireless power transmitter may configure/control a new operating point—amplitude, frequency, and duty cycle—by using the received control error packet, so as to control the power transfer. Therefore, the control error packet may be transmitted/received at a constant time interval during the power transfer phase, and, according to the exemplary embodiment, in case the wireless power receiver attempts to reduce the electric current of the wireless power transmitter, the wireless power receiver may transmit the control error packet by setting the control error value to a negative number. And, in case the wireless power receiver intends to increase the electric current of the wireless power transmitter, the wireless power receiver transmit the control error packet by setting the control error value to a positive number. During the induction mode, by transmitting the control error packet to the wireless power transmitter as described above, the wireless power receiver may control the power transfer.

In the resonance mode, which will hereinafter be described in detail, the device may be operated by using a method that is different from the induction mode. In the resonance mode, one wireless power transmitter should be capable of serving a plurality of wireless power receivers at the same time. However, in case of controlling the power transfer just as in the induction mode, since the power that is being transferred is controlled by a communication that is established with one wireless power receiver, it may be difficult to control the power transfer of additional wireless power receivers. Therefore, in the resonance mode according to the present disclosure, a method of controlling the amount of power that is being received by having the wireless power transmitter commonly transfer (or transmit) the basic power and by having the wireless power receiver control its own resonance frequency. Nevertheless, even during the operation of the resonance mode, the method described above in FIG. 10 will not be completely excluded. And, additional control of the transmitted power may be performed by using the method of FIG. 10.

Figure 11:
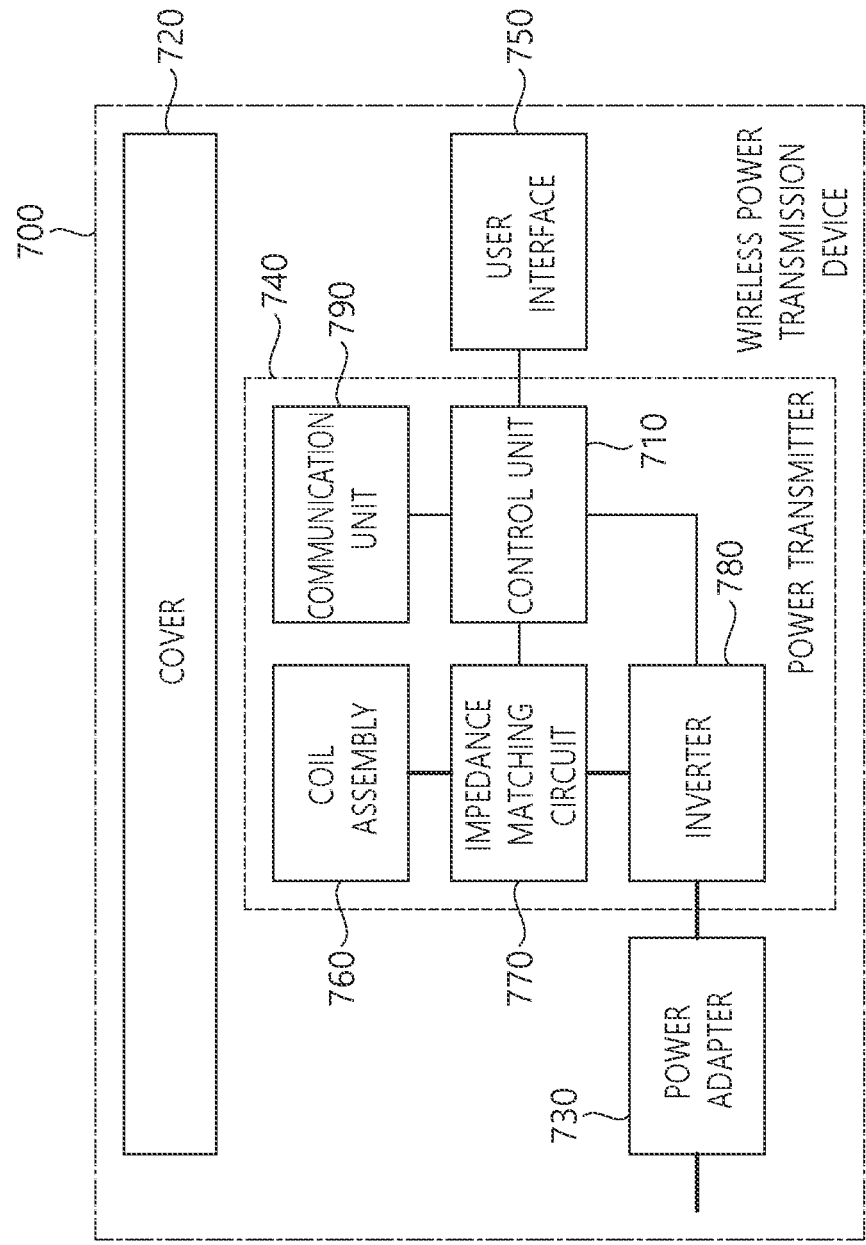
FIG. 11 is a block diagram of a wireless power transmitter according to another exemplary embodiment of the present disclosure.

FIG. 11 is a block diagram of a wireless power transmitter according to another exemplary embodiment of the present disclosure.

This may belong to a wireless power transfer system that is being operated in the magnetic resonance mode or the shared mode. The shared mode may refer to a mode performing a several-for-one (or one-to-many) communication and charging between the wireless power transmitter and the wireless power receiver. The shared mode may be implemented as a magnetic induction method or a resonance method.

Referring to FIG. 11, the wireless power transmitter (700) may include at least one of a cover (720) covering a coil assembly, a power adapter (730) supplying power to the power transmitter (740), a power transmitter (740) transmitting wireless power, and a user interface (750) providing information related to power transfer processing and other related information. Most particularly, the user interface (750) may be optionally included or may be included as another user interface (750) of the wireless power transmitter (700).

The power transmitter (740) may include at least one of a coil assembly (760), an impedance matching circuit (770), an inverter (780), a communication unit (790), and a control unit (710).

The coil assembly (760) includes at least one primary coil generating a magnetic field. And, the coil assembly (760) may also be referred to as a coil cell.

The impedance matching circuit (770) may provide impedance matching between the inverter and the primary coil(s). The impedance matching circuit (770) may generate resonance from a suitable frequency that boosts the electric current of the primary coil(s). In a multi-coil power transmitter (740), the impedance matching circuit may additionally include a multiplex that routes signals from the inverter to a subset of the primary coils. The impedance matching circuit may also be referred to as a tank circuit.

The impedance matching circuit (770) may include a capacitor, an inductor, and a switching device that switches the connection between the capacitor and the inductor. The impedance matching may be performed by detecting a reflective wave of the wireless power that is being transferred (or transmitted) through the coil assembly (760) and by switching the switching device based on the detected reflective wave, thereby adjusting the connection status of the capacitor or the inductor or adjusting the capacitance of the capacitor or adjusting the inductance of the inductor. In some cases, the impedance matching may be carried out even though the impedance matching circuit (770) is omitted. This specification also includes an exemplary embodiment of the wireless power transmitter (700), wherein the impedance matching circuit (770) is omitted.

The inverter (780) may convert a DC input to an AC signal. The inverter (780) may be operated as a half-bridge inverter or a full-bridge inverter in order to generate a pulse wave and a duty cycle of an adjustable frequency. Additionally, the inverter may include a plurality of stages in order to adjust input voltage levels.

The communication unit (790) may perform communication with the power receiver. The power receiver performs load modulation in order to communicate requests and information corresponding to the power transmitter. Therefore, the power transmitter (740) may use the communication unit (790) so as to monitor the amplitude and/or phase of the electric current and/or voltage of the primary coil in order to demodulate the data being transmitted from the power receiver.

Additionally, the power transmitter (740) may control the output power to that the data may be transferred through the communication unit (790) by using a Frequency Shift Keying (FSK) method, and so on.

The control unit (710) may control communication and power transfer (or delivery) of the power transmitter (740). The control unit (710) may control the power transfer by adjusting the above-described operating point. The operating point may be determined by, for example, at least any one of the operation frequency, the duty cycle, and the input voltage.

The communication unit (790) and the control unit (710) may each be provided as a separate unit/device/chipset or may be collectively provided as one unit/device/chipset.

Figure 12:
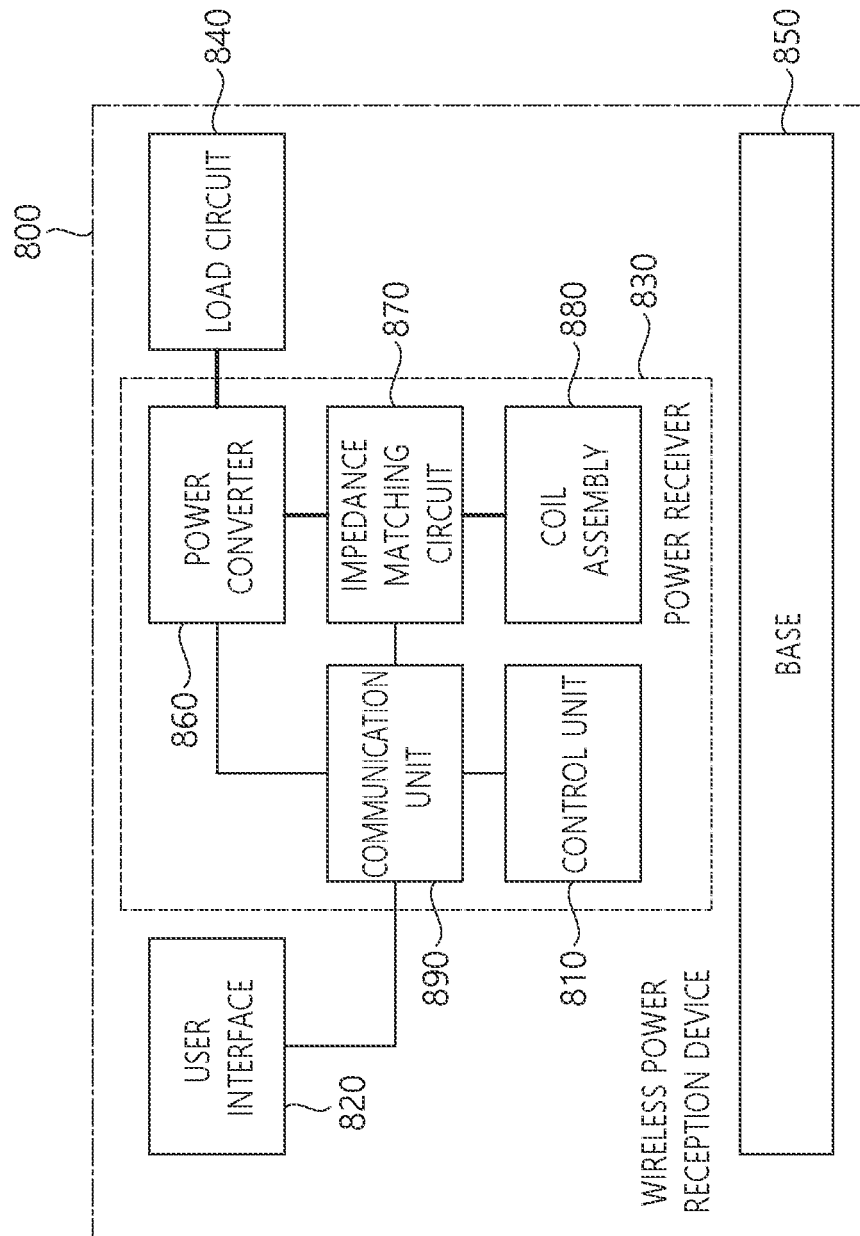
FIG. 12 shows a wireless power receiver according to another exemplary embodiment of the present disclosure.

FIG. 12 shows a wireless power receiver according to another exemplary embodiment of the present disclosure.

This may belong to a wireless power transfer system that is being operated in the magnetic resonance mode or the shared mode.

Referring to FIG. 12, the wireless power receiver (800) may include at least one of a user interface (820) providing information related to power transfer processing and other related information, a power receiver (830) receiving wireless power, a load circuit (840), and a base (850) supporting and covering the coil assembly. Most particularly, the user interface (820) may be optionally included or may be included as another user interface (820) of the wireless power receiver (800).

The power receiver (830) may include at least one of a power converter (860), an impedance matching circuit (870), a coil assembly (880), a communication unit (890), and a control unit (810).

The power converter (860) may convert the AC power that is received from the secondary coil to a voltage and electric current that are suitable for the load circuit. According to an exemplary embodiment, the power converter (860) may include a rectifier. The rectifier may rectify the received wireless power and may convert the power from an alternating current (AC) to a direct current (DC). The rectifier may convert the alternating current to the direct current by using a diode or a transistor, and, then, the rectifier may smooth the converted current by using the capacitor and resistance. Herein, a full-wave rectifier, a half-wave rectifier, a voltage multiplier, and so on, that are implemented as a bridge circuit may be used as the rectifier. Additionally, the power converter may adapt a reflected impedance of the power receiver.

The impedance matching circuit (870) may provide impedance matching between a combination of the power converter (860) and the load circuit (840) and the secondary coil. According to an exemplary embodiment, the impedance matching circuit may generate a resonance of approximately 100 kHz, which may reinforce the power transfer. The impedance matching circuit (870) may include a capacitor, an inductor, and a switching device that switches the combination of the capacitor and the inductor. The impedance matching may be performed by controlling the switching device of the circuit that configured the impedance matching circuit (870) based on the voltage value, electric current value, power value, frequency value, and so on, of the wireless power that is being received. In some cases, the impedance matching may be carried out even though the impedance matching circuit (870) is omitted. This specification also includes an exemplary embodiment of the wireless power receiver (200), wherein the impedance matching circuit (870) is omitted.

The coil assembly (880) includes at least one secondary coil, and, optionally, the coil assembly (880) may further include an element shielding the metallic part of the receiver from the magnetic field.

The communication unit (890) may perform load modulation in order to communicate requests and other information to the power transmitter.

For this, the power receiver (830) may perform switching of the resistance or capacitor so as to change the reflected impedance.

The control unit (810) may control the received power. For this, the control unit (810) may determine/calculate a difference between an actual operating point and a target operating point of the power receiver (830). Thereafter, by performing a request for adjusting the reflected impedance of the power transmitter and/or for adjusting an operating point of the power transmitter, the difference between the actual operating point and the target operating point may be adjusted/reduced. In case of minimizing this difference, an optimal power reception may be performed.

The communication unit (890) and the control unit (810) may each be provided as a separate device/chipset or may be collectively provided as one device/chipset.

As described in FIG. 9 etc., the wireless power transmitter and the wireless power receiver go through a Ping Phase and a Configuration Phase to enter the Negotiation Phase, or may go through a ping phase, a configuration phase, and a negotiation phase to enter a power transfer phase and then to a re-negotiation phase.

Figure 13:
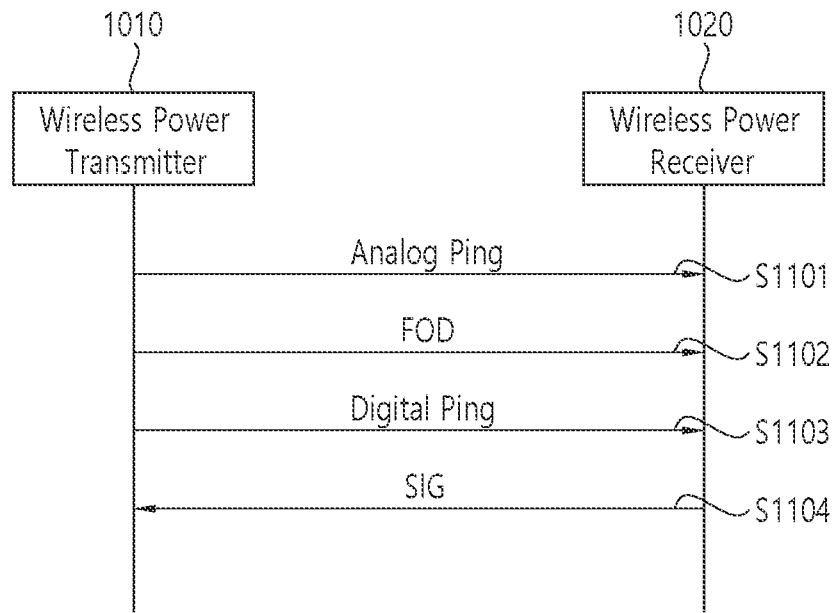
FIG. 13 is a flowchart schematically showing a ping phase protocol according to an embodiment.

FIG. 13 is a flowchart schematically showing a ping phase protocol according to an embodiment.

Referring to FIG. 13, in the ping phase, the wireless power transmitter 1010 transmits an analog ping to determine whether an object exists in the operating volume (S1101). The wireless power transmitter 1010 can detect whether an object exists in the operating space based on a change in current in the transmission coil or primary coil.

If an object is determined to exist within the operating space by an analog ping, the wireless power transmitter 1010 may perform foreign object detection (FOD) before power transmission to check whether foreign materials exist in the operating volume (S1102). The wireless power transmitter 1010 may perform operations to protect NFC cards and/or RFID tags.

Afterwards, the wireless power transmitter 1010 identifies the wireless power receiver 1020 by transmitting a digital ping (S1103). The wireless power receiving device 1020 receives a digital ping and recognizes the wireless power transmitting device 1010.

The wireless power receiver 1020 that receives the digital ping transmits a signal strength packet (SIG) to the wireless power transmitter 1010 (S1104).

The wireless power transmitter 1010 that receives the SIG from the wireless power receiver 1020 can identify that the wireless power receiver 1020 is located within an operating volume.

Figure 14:
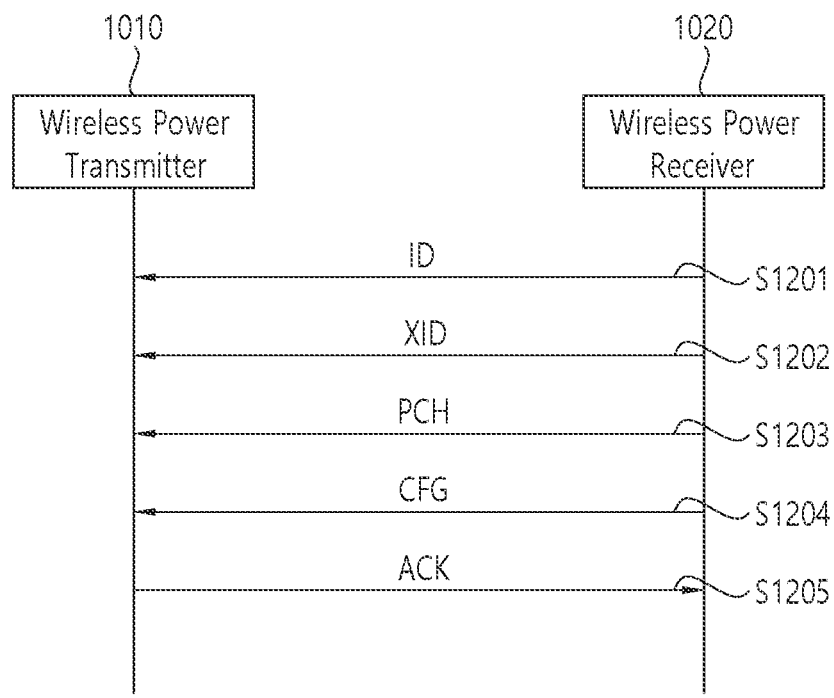
FIG. 14 is a flowchart schematically showing a configuration phase protocol according to an embodiment.

FIG. 14 is a flowchart schematically showing a configuration phase protocol according to an embodiment.

In the configuration phase (or identification and configuration phase), the wireless power receiving device 1020 transmits its identification information to the wireless power transmitting device 1010, the wireless power receiver 1020 and the wireless power transmitter 1010 can establish a baseline power transfer contract.

Referring to FIG. 14, in the configuration phase, the wireless power receiving device 1020 may transmit an ID (identification data packet) to the wireless power transmitting device 1010 to identify itself (S1201). Additionally, the wireless power receiving device 1020 may transmit an Extended Identification data packet (XID) to the wireless power transmitting device 1010 (S1202). Additionally, the wireless power receiving device 1020 may transmit a Power Control Hold-off data packet (PCH) to the wireless power transmitting device 1010 for a power transmission contract, etc. (S1203). Additionally, the wireless power receiving device 1020 can transmit a configuration packet (CFG, Configuration data packet) to the wireless power transmitting device (S1204).

When following the Extended Protocol for EPP, the wireless power transmitter 1010 may transmit ACK in response to CFG (S1205).

Figures 15, 16:
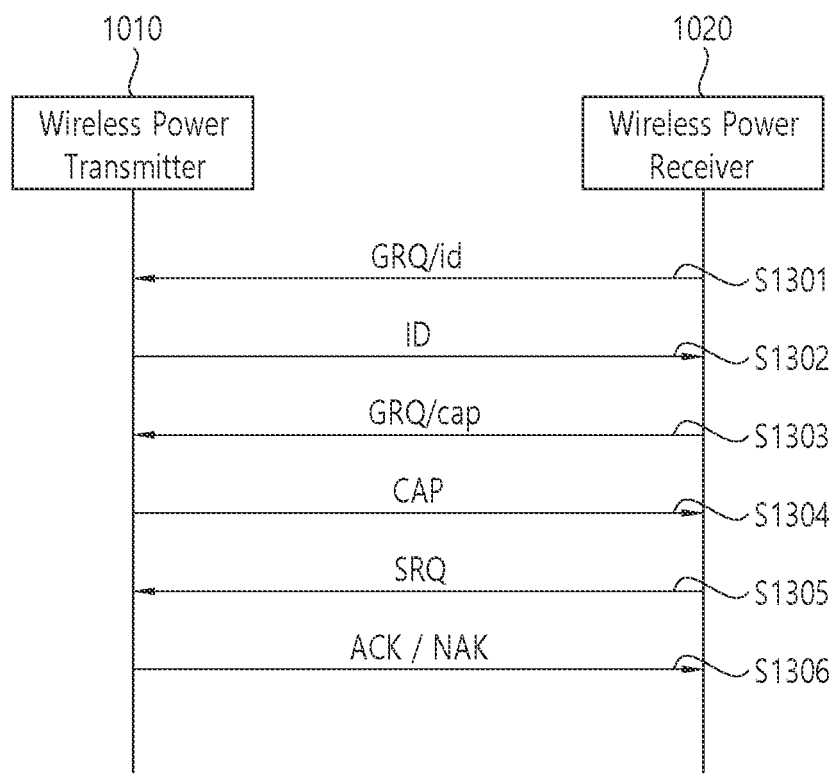
FIG. 15 is a diagram illustrating a message field of a configuration packet (CFG) of a wireless power reception device according to an embodiment.
FIG. 16 is a flowchart schematically showing a protocol of a negotiation phase or re-negotiation phase according to an embodiment.

FIG. 15 is a diagram illustrating a message field of a configuration packet (CFG) of a wireless power reception device according to an embodiment.

Figures 17, 18:
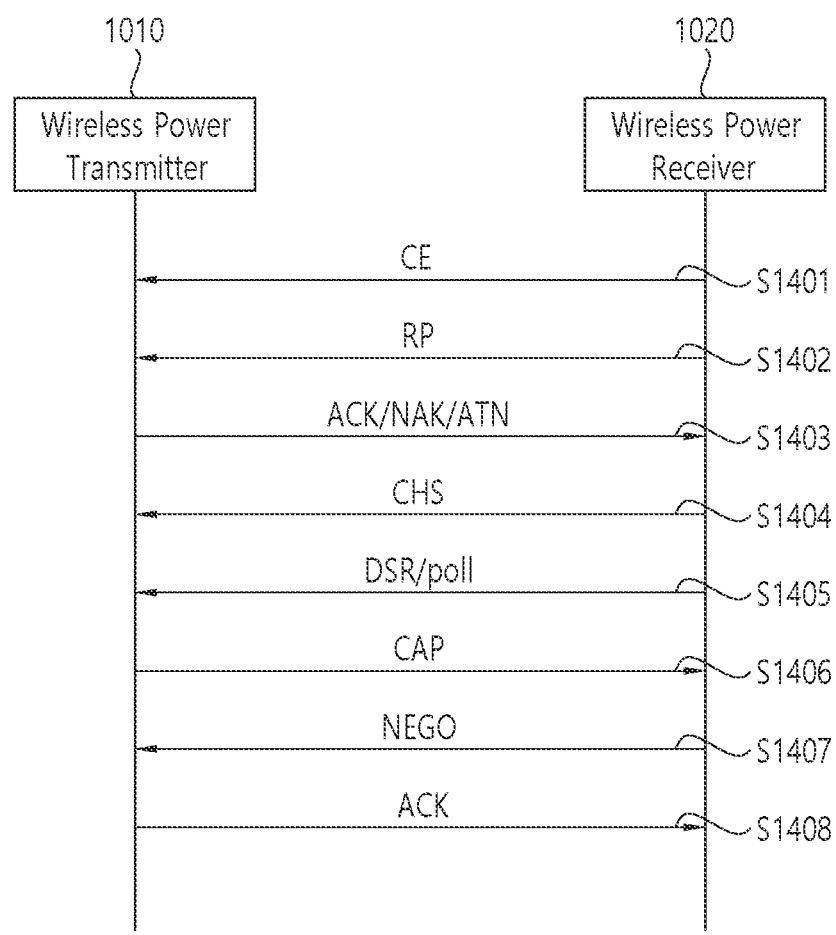
FIG. 17 is a diagram illustrating a message field of a capability packet (CAP) of a wireless power transmission device according to an embodiment.
FIG. 18 is a flowchart schematically showing the protocol of the power transfer phase according to one embodiment.

The configuration packet (CFG) according to one embodiment may have a header value of 0x51 and, referring to FIG. 18, may include a 5-byte message field.

Referring to FIG. 15, the message field of the configuration packet (CFG) may include a 1-bit authentication (AI) flag and a 1-bit outband (OB) flag.

The authentication flag (AI) indicates whether the wireless power receiving device 1020 supports the authentication function. For example, if the value of the authentication flag (AI) is '1', it indicates that the wireless power receiving device 1020 supports the authentication function or can operate as an authentication initiator, if the value of the authentication flag (AI) is '0', it may indicate that the wireless power receiving device 1020 does not support the authentication function or cannot operate as an authentication initiator.

The out-of-band (OB) flag indicates whether the wireless power receiver 1020 supports out-of-band communication. For example, if the value of the out-band (OB) flag is '1', the wireless power receiver 1020 instructs out-band communication, if the value of the out-of-band (OB) flag is '0', it may indicate that the wireless power receiver 1020 does not support out-of-band communication.

In the configuration phase, the wireless power transmitter 1010 receives the configuration packet (CFG) of the wireless power receiver 1020, the wireless power transmitter 1010 can check whether the wireless power receiver 1020 supports the authentication function and whether out-of-band communication is supported.

FIG. 16 is a flowchart schematically showing a protocol of a negotiation phase or re-negotiation phase according to an embodiment.

In the negotiation phase or re-negotiation phase, the Power Transfer Contract related to the reception/transmission of wireless power between a wireless power receiving device and a wireless power transmitting device is expanded or changed, or a renewal of the power transmission contract may be made to adjust at least some of the elements of the power transmission contract, or information may be exchanged to establish out-of-band communication.

Referring to FIG. 16, in the negotiation phase, the wireless power receiving device 1020 can receive the ID (Identification data packet) and CAP (Capabilities data packet) of the wireless power transmitting device 1010 using a General Request data packet (GRQ).

The general request packet (GRQ) may have a header value of 0x07 and may include a 1-byte message field. The message field of the general request packet (GRQ) may include the header value of the data packet that the wireless power receiving device 1020 requests from the wireless power transmitting device 1010 using the GRQ packet. For example, when the wireless power receiving device 1020 requests an ID packet of the wireless power transmitting device 1010 using a GRQ packet, the wireless power receiving device 1020 transmits a general request packet (GRQ/id) including the header value (0x30) of the ID packet of the wireless power transmitting device 1010 in the message field of the general request packet (GRQ).

Referring to FIG. 16, in the negotiation phase or re-negotiation phase, the wireless power receiving device 1020 may transmit a GRQ packet (GRQ/id) requesting an ID packet of the wireless power transmitting device 1010 to the wireless power transmitting device 1010 (S1301).

The wireless power transmission device 1010 that has received the GRQ/id may transmit an ID packet to the wireless power reception device 1020 (S1302). The ID packet of the wireless power transmitter 1010 includes information about the manufacturer code. The ID packet containing information about the Manufacturer Code allows the manufacturer of the wireless power transmission device 1010 to be identified.

Referring to FIG. 16, in the negotiation phase or re-negotiation phase, the wireless power receiving device 1020 may transmit a GRQ packet (GRQ/cap) requesting a capability packet (CAP) of the wireless power transmitting device 1010 to the wireless power transmitting device 1010 (S1303). The message field of GRQ/cap may include the header value (0x31) of the capability packet (CAP).

The wireless power transmitter 1010 that has received the GRQ/cap may transmit a capability packet (CAP) to the wireless power receiver 1020 (S1304).

FIG. 17 is a diagram illustrating a message field of a capability packet (CAP) of a wireless power transmission device according to an embodiment.

Figure 20:
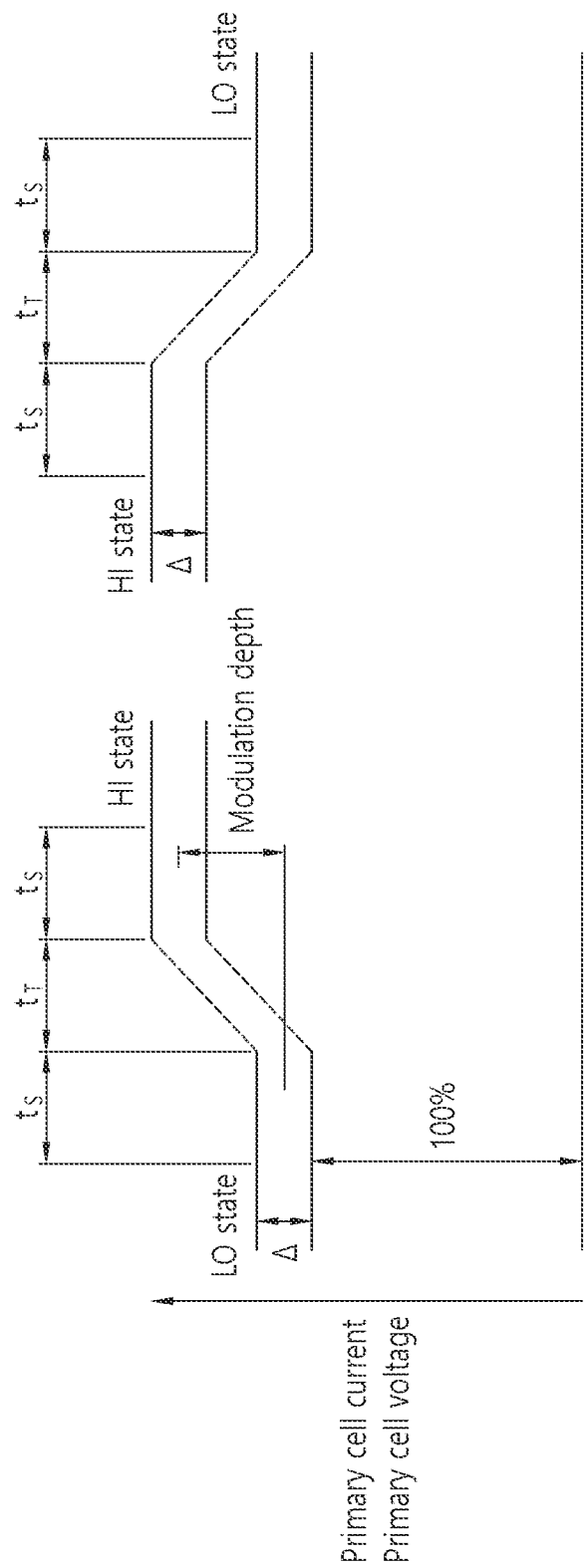
FIG. 20 schematically shows an example of amplitude modulation of a power signal.

A capability packet (CAP) according to one embodiment may have a header value of 0x31 and, referring to FIG. 20, may include a 3-byte message field.

Referring to FIG. 17, the message field of the capability packet (CAP) may include a 1-bit authentication (AR) flag and a 1-bit outband (OB) flag.

The authentication flag (AR) indicates whether the wireless power transmitter 1010 supports the authentication function. For example, if the value of the authentication flag (AR) is '1', it indicates that the wireless power transmitter 1010 supports the authentication function or can operate as an authentication responder, if the value of the authentication flag (AR) is '0', it may indicate that the wireless power transmitter 1010 does not support the authentication function or cannot operate as an authentication responder.

The outband (OB) flag indicates whether the wireless power transmitter 1010 supports outband communication. For example, if the value of the out-band (OB) flag is '1', the wireless power transmitter 1010 instructs out-band communication, if the value of the out-of-band (OB) flag is '0', it may indicate that the wireless power transmitter 1010 does not support out-of-band communication.

In the negotiation phase, the wireless power receiver 1020 receives the capability packet (CAP) of the wireless power transmitter 1010, the wireless power receiving device 1020 can check whether the wireless power transmitting device 1010 supports the authentication function and whether out-of-band communication is supported.

Also, referring to FIG. 16, in the negotiation phase or re-negotiation phase, using at least one specific request packet (SRQ, Specific Request data packet), the wireless power receiving device 1020 may update elements of a power transfer contract related to power to be provided in the power transfer phase and may end the negotiation phase or re-negotiation phase (S1305).

The wireless power transmitter 1010 transmits only ACK in response to a specific request packet (SRQ) depending on the type of the specific request packet (SRQ), or it transmits only ACK or NAK, or it can transmit only ACK or ND (S1306).

Data packets or messages exchanged between the wireless power transmitter 1010 and the wireless power receiver 1020 in the ping phase, configuration phase, and negotiation/renegotiation phase described above may be transmitted/received through in-band communication.

Although not shown separately, in order to expand the CAP packet, an XCAP packet, which is information about the capabilities of the wireless power transmitter, may be provided separately. Here, the XCAP packet may include a 1-bit out-of-band (OB) flag, similar to CAP.

FIG. 18 is a flowchart schematically showing the protocol of the power transfer phase according to one embodiment.

In the power transfer phase, the wireless power transmitter 1010 and the wireless power receiver 1020 can transmit/receive wireless power based on a power transfer contract.

Referring to FIG. 18, in the power transfer phase, the wireless power receiving device 1020 transmits a control error data packet (CE) containing information about the difference between the actual operating point and the target operating point to the wireless power transmitting device 1010 (S1401).

Additionally, in the power transfer phase, the wireless power receiving device 1020 transmits a received power packet (RP, Received Power data packet) containing information about the received power value of the wireless power received from the wireless power transmitter 1010 to the wireless power transmitting device 1010 (S1402).

In the power transfer phase, control error packets (CE) and received power packets (RP) are data packets that must be repeatedly transmitted/received according to the required timing constraints to control wireless power.

The wireless power transmitter 1010 can control the level of wireless power transmitted based on the control error packet (CE) and received power packet (RP) received from the wireless power receiver 1020.

The wireless power transmitter 1010 may respond to the received power packet (RP) with an 8-bit bit pattern such as ACK. NAK, and ATN (S1403).

The fact that the wireless power transmitter 1010 responds with ACK to a received power packet (RP/0) with a mode value of 0 means that power transmission can continue at the current level.

The fact that the wireless power transmitter 1010 responds with NAK to a received power packet (RP/0) with a mode value of 0 means that the wireless power receiver 1020 must reduce power consumption.

For received power packets (RP/1 or RP/2) with a mode value of 1 or 2, when the wireless power transmitter 1010 responds with ACK, it means that the wireless power receiver 1020 has accepted the power correction value included in the received power packet (RP/1 or RP/2).

For received power packets (RP/1 or RP/2) with a mode value of 1 or 2, when the wireless power transmitter 1010 responds with NAK, it means that the wireless power receiver 1020 did not accept the power correction value included in the received power packet (RP/1 or RP/2).

When the wireless power transmission device 1010 responds with ATN to the received power packet (RP), it means that the wireless power transmission device 1010 requests permission for communication.

The wireless power transmitter 1010 and the wireless power receiver 1020 can control the transmitted/received power levels based on control error packets (CE), received power packets (RP), and responses to received power packets (RP).

Additionally, in the power transfer phase, the wireless power receiving device 1020 transmits a charge status packet (CHS) containing information about the charging state of the battery to the wireless power transmitting device 1010 (S1404). The wireless power transmitter 1010 can control the power level of wireless power based on information about the charging state of the battery included in the charging status packet (CHS).

Meanwhile, in the power transfer phase, the wireless power transmission device 1010 and/or the wireless power reception device 1020 may enter the re-negotiation phase to renew the power transfer contract.

In the power transfer phase, when the wireless power transmitter 1010 attempts to enter the re-negotiation phase, the wireless power transmitter 1010 responds to the received power packet (RP) with ATN. In this case, the wireless power receiving device 1020 may transmit a DSR/poll packet to the wireless power transmitting device 1010 to give the wireless power transmitting device 1010 an opportunity to transmit a data packet (S1405).

When the wireless power transmitter 1010 transmits a capability packet (CAP or XCAP) to the wireless power receiver 1020 in response to the DSR/poll packet (S1406), the wireless power receiver 1020 transmits a renegotiation packet (NEGO) requesting the re-negotiation phase to proceed to the wireless power transmitter 1010 (S1407), when the wireless power transmitter 1010 responds with ACK to the renegotiation packet (NEGO) (S1408), the wireless power transmitter 1010 and the wireless power receiver 1020 enter the renegotiation phase.

In the power transfer phase, when the wireless power receiving device 1020 wants to enter the re-negotiation phase, the wireless power receiver 1020 transmits a renegotiation packet (NEGO) requesting the re-negotiation phase to proceed to the wireless power transmitter 1010 (S1407), when the wireless power transmitter 1010 responds with ACK to the renegotiation packet (NEGO) (S1408), the wireless power transmitter 1010 and the wireless power receiver 1020 enter the renegotiation phase.

Meanwhile, the wireless power transmission system may be equipped with an application layer message exchange function to support expansion into various application fields. Based on this function, device authentication-related information or other application-level messages can be transmitted and received between the wireless power transmitter 1010 and the wireless power receiver 1020. In order to exchange upper layer messages between the wireless power transmitter 1010 and the wireless power receiver 1020, a separate hierarchical architecture is required for data transmission, an efficient management and operation method for hierarchical architecture is required.

Hereinafter, this specification will be described in more detail.

Wireless charging methods include a magnetic induction method using a magnetic induction phenomenon between a primary coil and a secondary coil, and a magnetic resonance method in which magnetic resonance is achieved using a frequency in a band of several tens of kHz to several MHz to transmit power. Here, the wireless charging standard for the magnetic resonance method is led by a conference called A4WP, and the magnetic induction method is led by the WPC (Wireless Power Consortium). Here, the WPC is designed to exchange various status information and commands related to the wireless charging system in-band.

Meanwhile, the communication method used in WPC is classified as ASK/FSK, and the protocol is classified as BPP/EPP. BPP supports unidirectional communication of ASK communication from a wireless power receiver to a wireless power transmitter, and EPP supports bidirectional communication by adding FSK communication from a wireless power transmitter to a wireless power receiver in addition to ASK communication.

That is, the information transmitted from the wireless power receiver to the wireless power transmitter can be transmitted based on ASK using amplitude modulation, and information transmitted from the wireless power transmitter to the wireless power receiver may be transmitted based on FSK using frequency modulation.

Here, an example of the ASK signal is explained through the drawings as follows.

FIG. 19 schematically shows an example of an ASK signal.

According to FIG. 19, a binary sequence can be input to generate an ASK signal. Here, as an example of a binary sequence, a signal indicating 0 and a signal indicating 1 can be generated using 0V and 1V.

ASK is a method of indicating signals using amplitude. Accordingly, when the above binary sequence is input, the ASK signal may be generated when 1V is input, and the ASK signal may not be generated when 0V is input.

The generation of the above ASK signal is explained through the diagram from the perspective of the power signal used in the wireless charging system as follows.

FIG. 20 schematically shows an example of amplitude modulation of a power signal.

According to FIG. 20, so that the primary cell current and/or primary cell voltage can be assumed in two states named HI state and LO state, a wireless power receiver can modulate the amount of power it draws from the power signal. Here, the state is characterized in that the amplitude is constant within a certain fluctuation (A) for at least is (ms).

The parameters of the power signal that can be applied in FIG. 20 are explained through the drawings as follows.

FIG. 21 schematically shows examples of parameters for amplitude modulation of a power signal.

According to FIG. 21, the following parameters can be defined.

Maximum transition time: The symbol at this time may be defined as, for example, t_T. Here, the maximum transition time may be, for example, 100 us.

Minimum stable time: The symbol at this time can be defined as, for example, t_S. Here, the minimum stable time may be, for example, 150 us.

Current amplitude variation: The symbol at this time can be defined as, for example, $\Delta$. Here, the value of Current amplitude variation may be, for example, 8 mA.

Voltage amplitude variation: The symbol at this time can be defined as, for example, $\Delta$. Here, the value of Voltage amplitude variation may be, for example, 110 mV.

Here, the difference in amplitude between the HI and LO states may be at least 15 mA (primary cell current) in terms of current. Additionally, the difference in amplitude between HI and LO states may be at least 200 mV (primary cell voltage) from a voltage perspective.

Hereinafter, a method for transmitting an ASK signal in a wireless charging system will be described in more detail.

Figure 22:
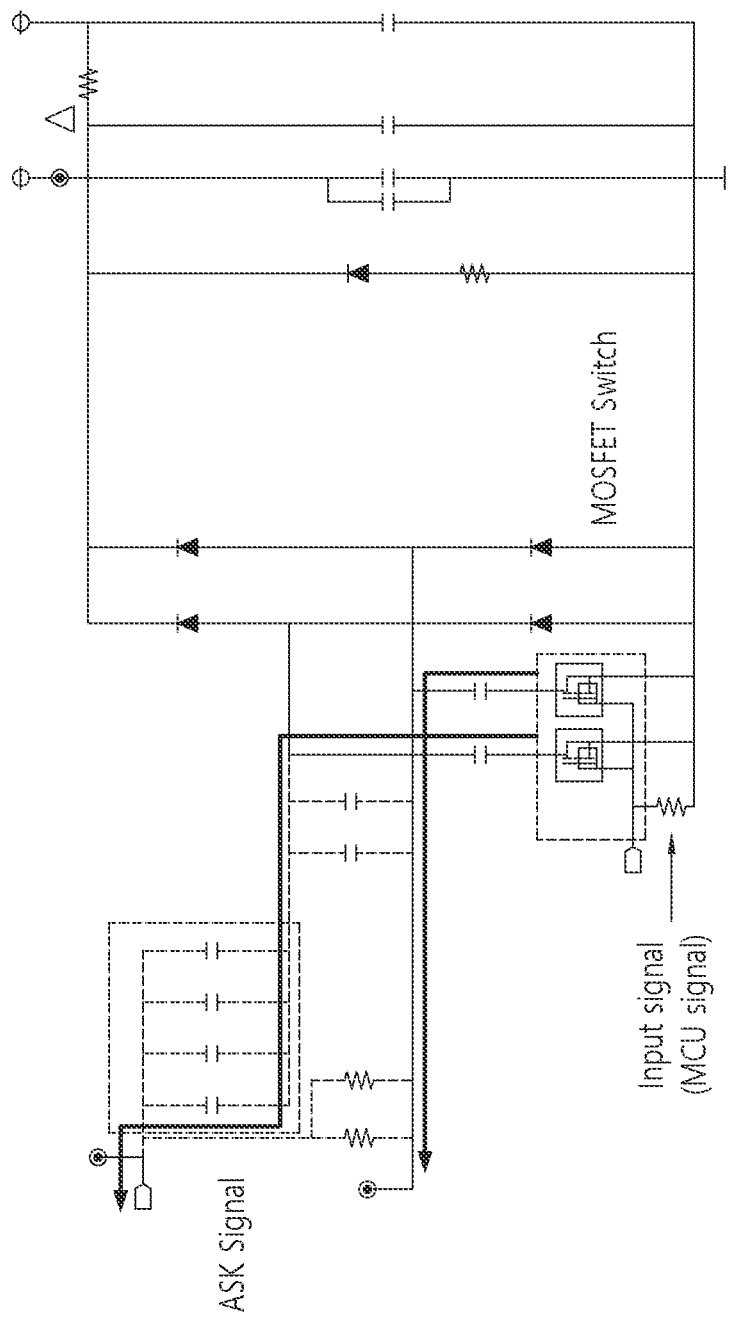
FIG. 22 shows an example of a circuit that generates an ASK signal.

FIG. 22 shows an example of a circuit that generates an ASK signal.

According to FIG. 22, a signal may be input to the MOSFET gate related to ASK signal generation in the wireless power receiver. Here, the signal may be, for example, an MCU signal, and the input signal may be a high signal and/or a low signal. At this time, a high signal can have a high voltage, and a low signal can have a low voltage. As an example, a high signal may have a voltage of 3.3V, and a low signal may have a voltage of 0V.

The above input signal can ultimately be implemented as a high/low signal in 'Coil v'. High/low signals implemented in this way, that is, created, can be transmitted through the ASK signal.

Here, high/low signals can be implemented, that is, created, by turning on/off the MOSFET switch. In other words, the ASK signal can be generated by turning the MOSFET switch on/off.

For example, when the gate of the switch above is closed, a high signal can be generated, and when the gate of the switch is opened, a low signal can be generated in the form of an ASK signal.

An example of the generated ASK signal is explained through the drawing as follows.

Figure 23:
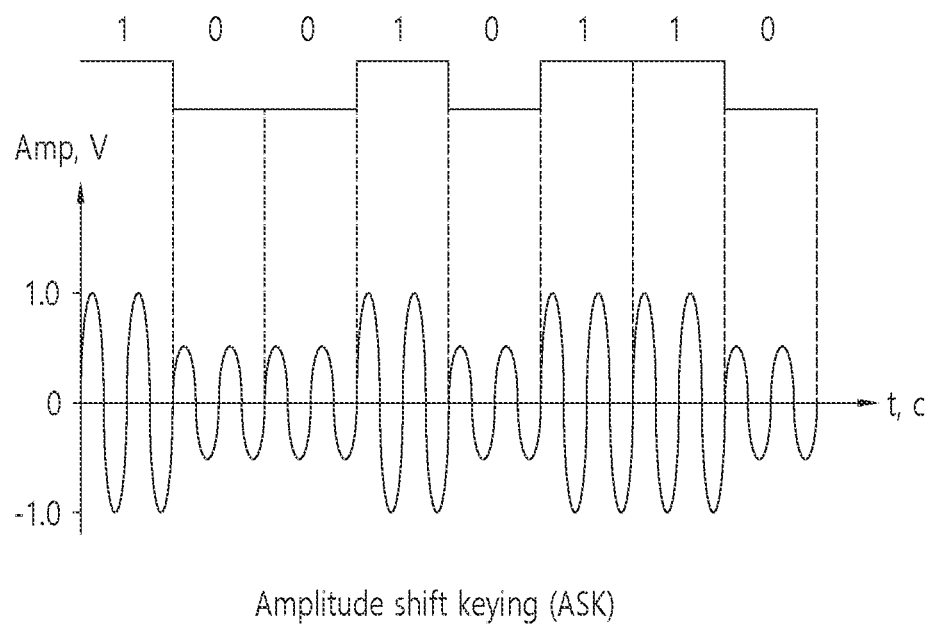
FIG. 23 schematically shows an example of an ASK signal generated based on the operation of a MOSFET switch.

FIG. 23 schematically shows an example of an ASK signal generated based on the operation of a MOSFET switch.

According to FIG. 23, a signal '1, 0, 0, 1, 0, 1, 1, 0' may be input as an input signal from the wireless power receiver.

Based on this signal being input, the wireless power receiver can generate an ASK signal, if 1 is input, a relatively high amplitude (+−1.0V) may be output, and if 0 is input, a relatively lower amplitude than +−1.0V may be output.

Of course, this corresponds to an example, and this specification also provides an example in which a relatively low amplitude is output when 1 is input and a relatively high amplitude is output when 0 is input.

Meanwhile, as previously explained in FIG. 21, in the current wireless charging system, the value of the current amplitude change is 8 mA and the value of the voltage amplitude change is 110 mV. In the current wireless charging system, only about 10 W of power is transmitted between the wireless power transmitter and wireless power receiver, at this time, the value of the voltage amplitude change of 110 mV was not a big problem for the wireless power transmitter to decode the ASK signal received from the wireless power receiver.

However, future wireless power transmission systems are intended to transmit large powers, such as 30 W, 50 W, and 100 W, rather than 10 W. And, when such a large amount of power is transmitted, the fluctuation range of the communication signal through amplitude modulation becomes larger, which causes the power transmission to fluctuate. That is, when large power is transmitted, the fluctuation range of the communication signal through amplitude modulation increases, making it difficult for the wireless power transmitter to decode the ASK signal received from the wireless power receiver.

An example of this problem is explained through drawings as follows.

Figure 24:
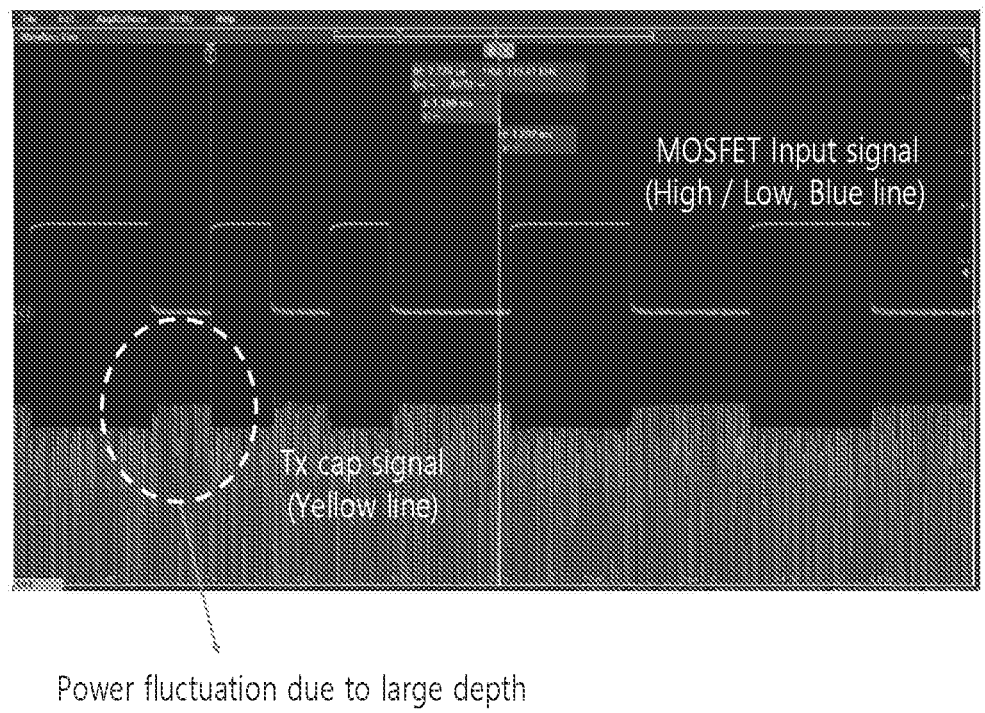
FIGS. 24 and 25 schematically show examples of input signals and signals generated thereby.
Figure 25:
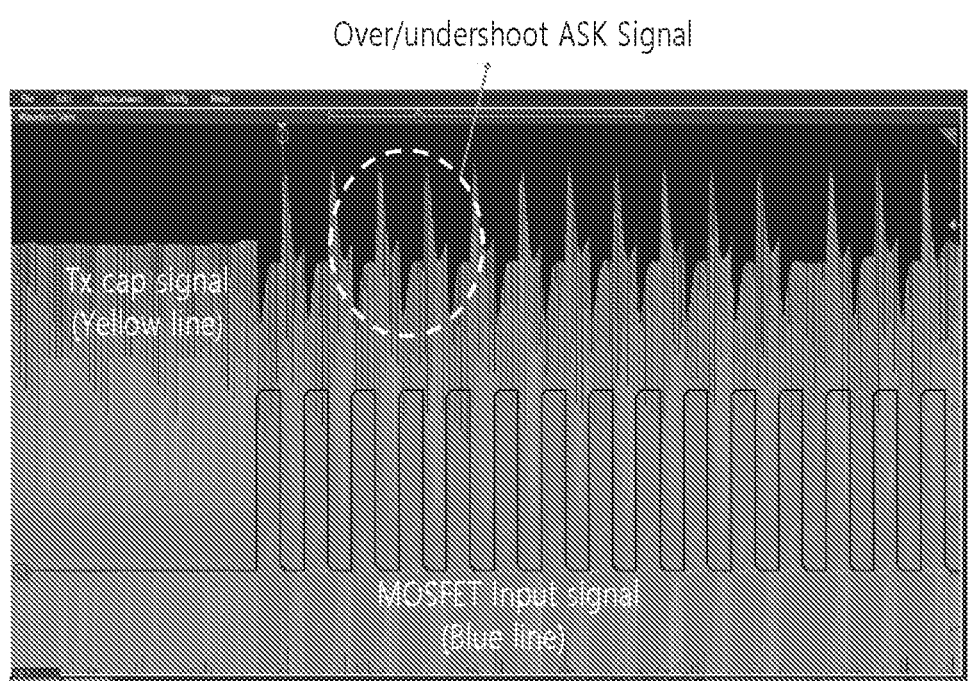

FIGS. 24 and 25 schematically show examples of input signals and signals generated thereby.

According to FIGS. 24 and 25, as previously described, the input signal of the MOSFET is input high/low, so that, for example, the ASK signal can be generated at 'coil v' in FIG. 22. Additionally, the wireless power receiver can perform in-band communication with the wireless power transmitter through the ASK signal. Here, in FIGS. 24 and 25, the horizontal axis may correspond to the time axis, and the vertical axis may correspond to the voltage or current axis.

At this time, the 'blue line' in FIGS. 24 and 25 is a signal input to the MOSFET, depending on the input signal, an ASK signal (TX CAP signal: that is, a transmission capacitor signal of a wireless power receiver) such as a 'yellow line' may be generated in 'Coil v'.

FIG. 24 shows an example in which power fluctuates significantly under a high power transmission amount. As shown in FIG. 24, when a high/low signal (e.g., with a large depth) is input to the MOSFET, an ASK signal with a large depth may be generated in the ASK signal generator of the wireless power receiver. As above, if the depth is large, the power of the generated ASK signal fluctuates significantly every time the high/low signal is switched, causing a problem of the power transmission amount fluctuating.

FIG. 25 shows an example in which over/under shooting occurs significantly under a high power transmission amount. Under high power transmission as shown in FIG. 25, whenever the high/low of the input signal changes, overshooting (i.e., an example in which power or voltage is amplified in a positive direction) and/or undershooting (i.e., an example in which power or voltage is amplified in a negative direction) of the ASK signal occurs significantly. As such, when overshooting and/or undershooting occurs significantly, the wireless power transmitter receiving the above signal may not be able to properly decode the ASK signal due to the presence of overshooting and/or undershooting.

Meanwhile, the alignment between the wireless power receiver and the wireless power transmitter may be misaligned, and the wireless power receiver may be placed under a low coupling situation in which the coupling factor is low. In such a low coupling situation, it is difficult to use high power between the wireless power transmitter and the wireless power receiver, which may result in a low power state.

In such a low power and/or low coupling system, it is difficult to control the amplitude due to the low power and/or low coupling, so it is difficult to distinguish between 0 and 1 signals and generate different amplitudes.

Accordingly, in low power and/or low coupling situations, it is difficult for the wireless power transmitter to accurately decode the ASK signal received from the wireless power receiver because the difference in amplitude is not large.

To summarize the problems explained previously, the problems are as follows.

Problem 1: As the power transmission amount increases, such as 30 W/60 W/120 W, the voltage and current of the driven primary cell increase. For this reason, when an ASK signal is generated by turning the MOSFET switch on/off, overshooting and/or undershooting of the generated ASK signal is strong, causing the power transmission signal to fluctuate, causing a problem in which the amount of power transmission fluctuates.

Problem 2: Conversely, in the case of low coupling and/or low power power transmission, the modulation depth is small, making it difficult to distinguish whether the generated ASK signal indicates 0 or 1. In other words, it becomes difficult for the wireless power transmitter to accurately check the ASK signal, making it difficult for the wireless power transmitter to decode the ASK signal.

In order to solve the above problem, this specification presents configurations that adjust the amplitude of the ASK signal depending on the amount of transmitted power and/or the degree of coupling.

The following drawings were prepared to explain a specific example of the present specification. Since the names of specific devices or specific signals/messages/fields described in the drawings are provided as examples, the technical features of this specification are not limited to the specific names used in the drawings below.

Figure 26:
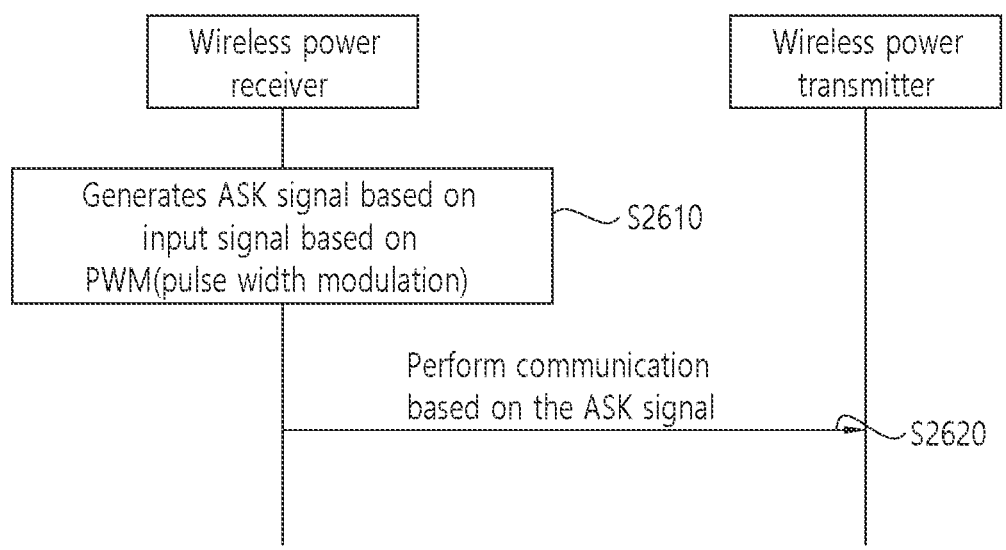
FIG. 26 is a flowchart of a method for generating an ASK signal based on PWM, according to an embodiment of the present specification.

FIG. 26 is a flowchart of a method for generating an ASK signal based on PWM, according to an embodiment of the present specification.

According to FIG. 26, the wireless power receiver can generate an ASK signal based on an input signal based on PWM (pulse width modulation) (S2610). That is, instead of high/low signals being input to the MOSFET of the wireless power receiver, a PWM signal can be input.

More specifically, if the MOSFET switch was previously turned on/off, in this specification, a PWM signal can be input instead of turning the existing switch on/off. That is, in this specification, the on/off of the switch can be changed to PWM.

For example, a PWM signal can be input (generated) from the MOSFET switch only in the modulation (e.g., HI-ST) section of the ASK signal. In other words, the PWM signal can be input only for the existing high input signal section.

Additionally, in the non-modulation (eg, LO-ST) section of the ASK signal, the PWM signal may not be input (generated) from the MOSFET switch. In other words, the PWM signal may not be input in the existing low input signal section.

Here, the above examples are merely examples. That is, in this specification, the PWM signal may not be input in the modulation section of the ASK signal, and the PWM signal may be input in the non-modulation section of the ASK signal. In other words, the PWM signal can be applied even when HI-ST and LO-ST are opposite to the above, so the PWM signal can be generated from the MOSFET switch only in the non-modulation (HI-ST) section of the ASK signal.

For example, the point at which PWM starts in the MOSFET switch may be the same as the point at which modulation (HI-ST) of the ASK signal starts, for example, the point at which PWM ends in the MOSFET switch may be the same as the point at which the ASK signal starts with non-modulation (LO-ST) and/or the point at which modulation (HI-ST) ends.

Meanwhile, in the wireless power receiver according to the present specification, the duty, frequency, and/or phase difference from the original power signal can be controlled, based on the above controls, the depth, overshoot, and/or undershoot of the ASK modulation can be controlled.

That is, the wireless power receiver according to the present specification can increase or decrease the modulation depth based on the above control, the wireless power receiver can control (increase or decrease) overshooting and/or undershooting based on such depth adjustment. If overshooting and/or undershooting are reduced, the stable time of the ASK signal can be increased and the transient time can be decreased.

Here, a specific method of controlling ASK modulation by controlling PWM will be explained through, for example, FIG. 27, which will be described later.

Thereafter, the wireless power receiver may communicate with the wireless power transmitter based on the ASK signal (S2620). That is, the wireless power receiver can transmit information related to wireless power communication to the wireless power transmitter through the above ASK signal, that is, through the ASK signal generated based on an input signal called PWM.

Hereinafter, a method of controlling ASK modulation by controlling PWM will be explained through drawings.

Figure 27:
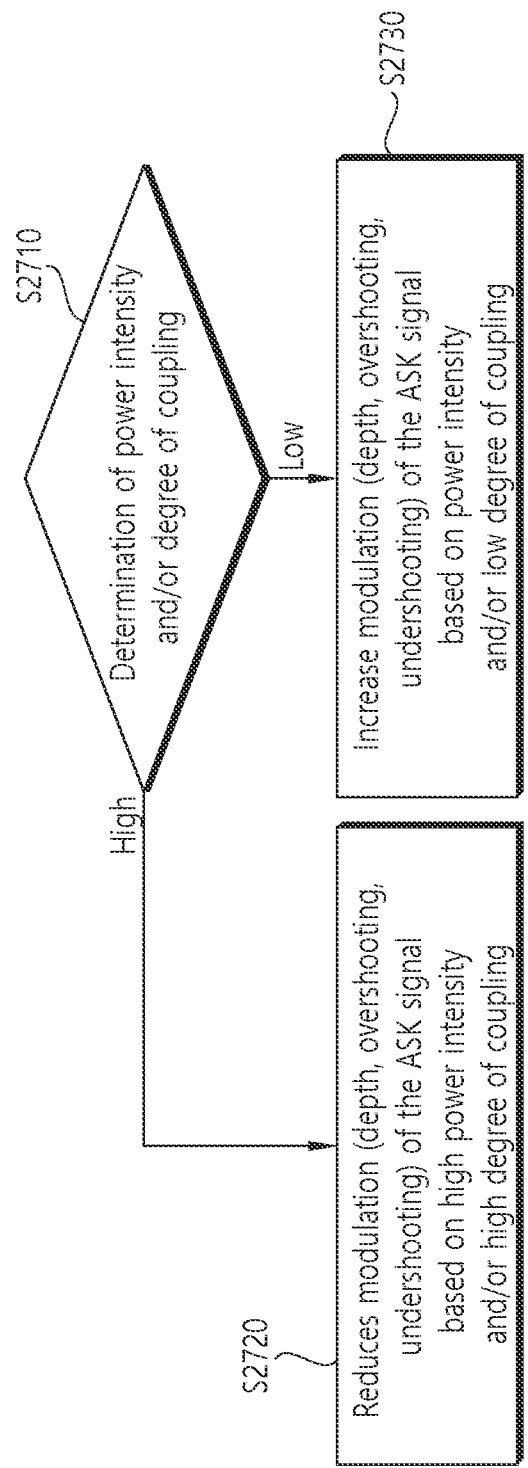
FIG. 27 is a flowchart of an example of a method for controlling ASK modulation by controlling PWM.

FIG. 27 is a flowchart of an example of a method for controlling ASK modulation by controlling PWM.

According to FIG. 27, the wireless power receiver can determine the power intensity and/or coupling degree (S2710).

At this time, the degree of power intensity (based on reception, not power transmission) may mean, for example, 5 W or less means low power intensity, 5-30 W means normal power intensity, and 30 W or more means high power intensity.

In addition, the degree of the coupling factor is low, for example, 0.3 or less. 0.3-0.5 can mean moderate, and equal to or greater than 0.5 can mean high.

Here, the above numerical value corresponds to an example of the embodiment provided in the present specification, and the degree of power intensity and the degree of coupling factor are not necessarily restricted by the above numerical value.

Meanwhile, when the power intensity and/or coupling factor are high, and when the power intensity and/or coupling factor are low, the wireless power receiver/wireless power transmitter may operate as in 1 and 2 to be described later.

In addition, even when the power intensity is normal, the ASK depth, etc. may be large or small due to external factors or power instability. At this time, if the ASK depth, etc. is large, the wireless power receiver/wireless power transmitter can operate through the method shown in 1 below, if the ASK depth, etc. is small, the wireless power receiver/wireless power transmitter can operate through the method shown in 2 below.

Additionally, even when the coupling factor is normal, the ASK depth, etc. may be large or small due to problems such as misalignment. At this time, if the ASK depth, etc. is large, the wireless power receiver/wireless power transmitter can operate through the method shown in 1 below, if the ASK depth, etc. is small, the wireless power receiver/wireless power transmitter can operate through the method shown in 2 below.

For understanding of the specification, an example of whether the ASK depth is amplified/reduced depending on the size of the power intensity and/or the size of the coupling degree may be described as follows.

Power transmission equal to or less than 5 W (based on reception). ASK depth amplification can be performed regardless of the coupling factor value.

Power transmission 5-15 W (based on reception): ASK depth amplification may be performed under conditions where the coupling factor is lowered (e.g., coil-mismatch and/or misalignment conditions).

Here, coil mismatch may be a case where the coil size is different between the wireless power transmitter/wireless power receiver.

Here, misalignment may be a case where the alignment of coils between the wireless power transmitter/wireless power receiver is misaligned.

Power transmission 15-30 W (based on reception):

In conditions where the coupling factor is lowered (e.g., coil-mismatched and/or misaligned conditions), amplification of the ASK depth may be necessary.

On the other hand, under conditions where the coupling factor is equal to or greater than normal, the ASK depth can be reduced depending on the power transmission environment.

Power transmission equal to or greater than 30 W (based on reception): ASK depth may be reduced under conditions where the coupling factor is equal to or greater than normal.

However, under conditions where the coupling factor is very low (equal to or less than 0.3)(and when power transmission is not interrupted due to the low coupling factor (in other words, charging is not interrupted)), depending on the situation, amplification of ASK depth may be performed.

Here, the condition for the coupling factor to be very low may be, for example, equal to or less than 0.15, regardless of the power transfer value. In addition, the condition for lowering the coupling factor may be, for example, equal to or less than 0.3, regardless of the power transfer value. Additionally, the condition under which the coupling factor is usually equal to or greater may be, for example, 0.3-0.5, regardless of the power transfer value.

Below, the two control methods for ASK modulation according to the results of the above judgment are summarized as follows.

1. When the Power Intensity and/or Degree of Coupling is High

When the intensity of power is high and/or the degree of coupling is high (mainly when the intensity of power is high), problems such as problem 1 may occur, for example, as described above.

That is, in the case of high power, the depth of the modulated ASK signal increases due to the intensity of the high power, and because of this, when the input signal changes from a high signal to a low signal or when the input signal changes from a low signal to a high signal, overshooting and/or undershooting of the ASK signal occurs significantly.

In order to solve the above problem, the wireless power receiver can reduce the modulation of the output ASK signal by adjusting the frequency or phase of the input PWM signal.

That is, the wireless power receiver can reduce the modulation (depth, overshooting, undershooting) of the ASK signal based on the power intensity and/or high degree of coupling (S2720).

More specifically, to reduce ASK modulation (in other words, to reduce the difference between operating frequency (fop) and modulation frequency (fmod)), the wireless power receiver may match the phase of the input PWM signal to be opposite to the phase of the original signal (e.g., power signal). In other words, the wireless power receiver can adjust the difference between the phase of the PWM and the phase of the input signal to be 180 degrees.

As shown above, an example in which the difference between the phase of the PWM and the phase of the input signal is close to 180 degrees is explained through the drawing as follows.

Figure 28:
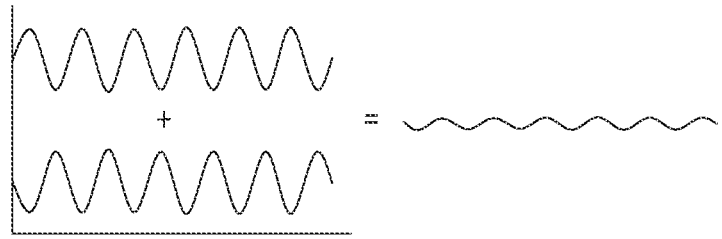
FIG. 28 schematically shows an example in which the difference between the phase of the PWM and the phase of the input signal is close to 180 degrees.

FIG. 28 schematically shows an example in which the difference between the phase of the PWM and the phase of the input signal is close to 180 degrees.

According to FIG. 28, the wireless power receiver can adjust the phase of the PWM signal to have a difference of 180 degrees from the phase of the input signal, an example of which is shown on the left side of FIG. 28.

When combining a PWM signal and an input signal in a situation where the difference between the phase of the PWM signal and the phase of the input signal is close to 180 degrees, as shown on the right side of FIG. 28, the amplitude of the ASK signal, which is an output signal, may be reduced.

Returning to FIG. 27, when the difference between the phase of the PWM signal and the phase of the input signal is close to 180 degrees, overshooting and/or undershooting of the ASK signal may be reduced.

Additionally (or separately), the smaller the frequency of the PWM signal, the more the above modulation can be reduced. That is, in a situation where the phase difference is close to 180 degrees, the smaller the frequency, the further the modulation can be reduced.

Figure 29:
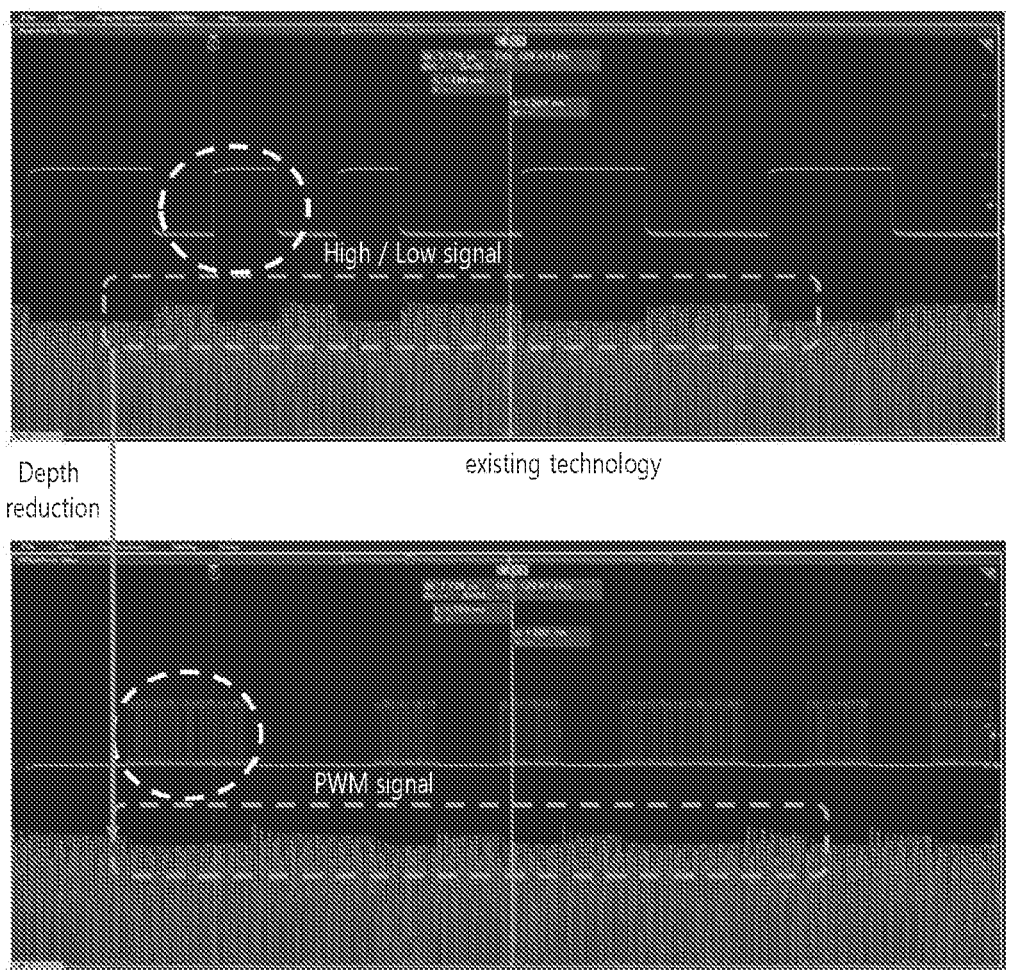
FIG. 29 schematically shows an example in which the depth is reduced due to the difference between the conventional technology and the technology proposed in this specification.

FIG. 29 schematically shows an example in which the depth is reduced due to the difference between the conventional technology and the technology proposed in this specification.

According to the top of FIG. 29, at high power, the difference in depth of the generated ASK signal increases depending on the high/low signal. Depending on this difference in depth, the problem in problem 1 described above (for example, a problem where overshooting occurs significantly) may occur.

According to the bottom of FIG. 29, the modulation width of the ASK signal can be reduced through the PWM signal. In other words, the wireless power receiver can reduce the depth of the ASK signal by controlling the phase, frequency, duty, etc. of the PWM signal. As an example, as explained previously, by matching the phase of the PWM signal opposite to the phase of the power signal (i.e., matching so that the difference between the phase of the PWM signal and the phase of the power signal is 180 degrees), the wireless power receiver can reduce the amplitude of the output ASK signal.

Hereinafter, returning to FIG. 27, an example of a case where the power intensity and/or degree of coupling is low will be described.

2. When the Power Intensity and/or Degree of Coupling is Low.

If the intensity of power is low and/or the degree of coupling is low, problems such as problem 2 may occur, as described above.

That is, in the case of low power or low coupling, the depth of the modulated ASK signal may be very small, because of this, even when the input signal changes from a high signal to a low signal, or even when the input signal changes from a low signal to a high signal, it becomes difficult to distinguish whether the output ASK signal is a signal on which modulation has been performed or a signal on which modulation has not been performed.

To solve the above problem, the wireless power receiver can increase the modulation of the output ASK signal by adjusting the frequency or phase of the input PWM signal.

That is, the wireless power receiver can increase the modulation (depth, overshooting, undershooting) of the ASK signal based on the power intensity and/or the low degree of coupling (S2730).

More specifically, to increase ASK modulation (in other words, to increase the difference between operating frequency (fop) and modulation frequency (fmod)), the wireless power receiver can match the phase of the input PWM signal to the phase of the original signal (e.g., power signal). In other words, the wireless power receiver can adjust the difference between the phase of the PWM and the phase of the input signal to be 0 degrees.

As shown above, an example in which the difference between the phase of the PWM and the phase of the input signal is close to 0 degrees is explained through the drawing as follows.

Figure 30:
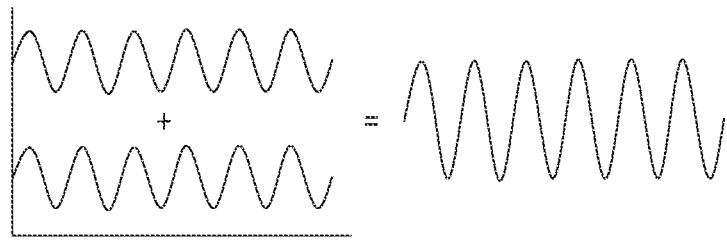
FIG. 30 schematically shows an example in which the difference between the phase of the PWM and the phase of the input signal is close to 0 degrees.

FIG. 30 schematically shows an example in which the difference between the phase of the PWM and the phase of the input signal is close to 0 degrees.

According to FIG. 30, the wireless power receiver can adjust the phase of the PWM signal to have a difference of 0 degrees from the phase of the input signal, an example of which is shown on the left side of FIG. 30.

In a situation where the difference between the phase of the PWM signal and the phase of the input signal is close to 0 degrees, when combining a PWM signal and an input signal, the amplitude of the ASK signal, which is an output signal, may increase, as shown on the right side of FIG. 30.

Returning to FIG. 27, when the difference between the phase of the PWM signal and the phase of the input signal is close to 0 degrees, overshooting and/or undershooting of the ASK signal may increase. In other words, when the difference between the phase of the PWM signal and the phase of the input signal is close to 0 degrees, the difference between the modulated ASK signal and the unmodulated ASK signal can become clear.

Additionally (or separately), the higher the frequency of the PWM signal, the greater the modulation can be. In other words, as the frequency increases in a situation where the phase difference is close to 0 degrees, the modulation can increase.

So far, examples of ASK signal control have been described in detail. The example previously described in FIG. 27 is summarized as follows.

1. ASK Signal Control Using PWM of MOSFET Switch at High Power

At high power, the modulation depth of the ASK signal can be reduced by using the PWM of the MOSFET switch. Through this, overshoot and undershoot are reduced, enabling stable power transmission when transmitting the ASK signal. In other words, because the ASK modulation depth is reduced, the fluctuation of power transmission amount during ASK transmission is reduced.

2. ASK Signal Control Using PWM of MOSFET Switches at Low Power/Low Coupling

At low power and low coupling, the modulation depth of the ASK signal is small, making it difficult for the wireless power transmitter to perform ASK decoding. In this case, the modulation depth of the ASK signal can be increased by using PWM for the MOSFET switch, allowing the wireless power transmitter to easily decode ASK.

The previously described embodiment is described in another form through drawings as follows.

Figure 31:
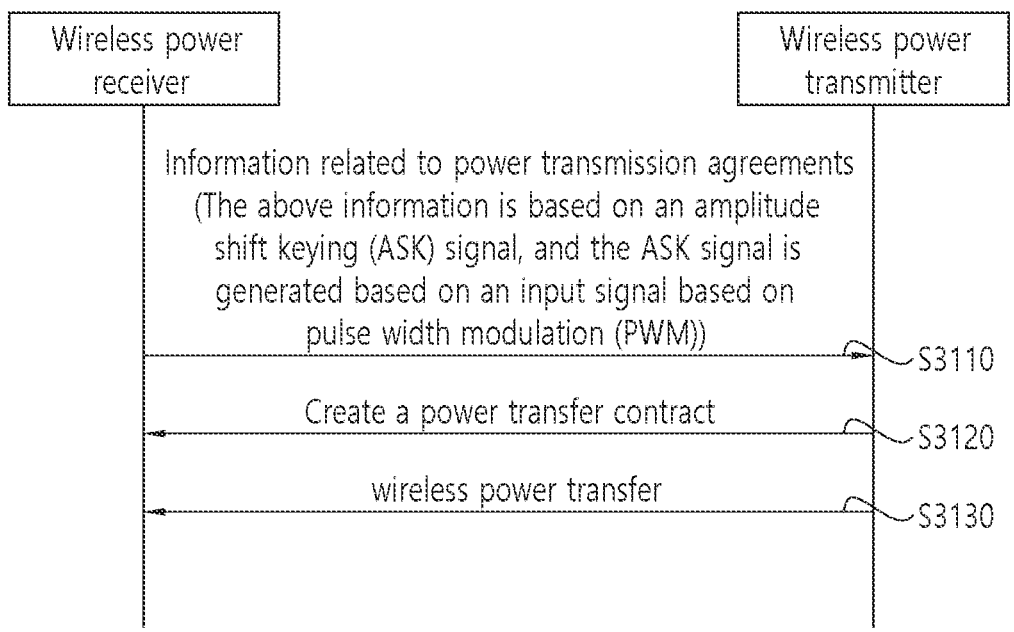
FIG. 31 is a flowchart of a method for generating an ASK signal based on PWM, according to another embodiment of the present specification.

FIG. 31 is a flowchart of a method for generating an ASK signal based on PWM, according to another embodiment of the present specification.

The wireless power receiver may transmit information related to the power transfer contract to the wireless power transmitter (S3110). Here, the information may be a signal based on an amplitude shift keying (ASK) signal. And, at this time, the ASK signal can be generated based on an input signal based on PWM (pulse width modulation).

In this example, an example is described in which information related to a power transfer contract is transmitted from a wireless power receiver to a wireless power transmitter through an ASK signal based on PWM, but this is only an example.

In other words, the ASK signal based on PWM, which is an embodiment of the present specification, can be applied to any information transmitted from the wireless power receiver to the wireless power transmitter.

Afterwards, the wireless power receiver may create a power transfer contract with the wireless power transmitter (S3110). Here, an example of creating a power transfer contract is the same as described above.

The wireless power receiver may receive wireless power from the wireless power transmitter based on the generated power transfer contract (S3130). Here, the content of the wireless power receiver receiving power from the wireless power transmitter is the same as described above.

Hereinafter, embodiments of the present specification will be described again from the viewpoint of various subjects.

The following drawings were prepared to explain a specific example of the present specification. Since the names of specific devices or specific signals/messages/fields described in the drawings are provided as examples, the technical features of this specification are not limited to the specific names used in the drawings below.

Figure 32:
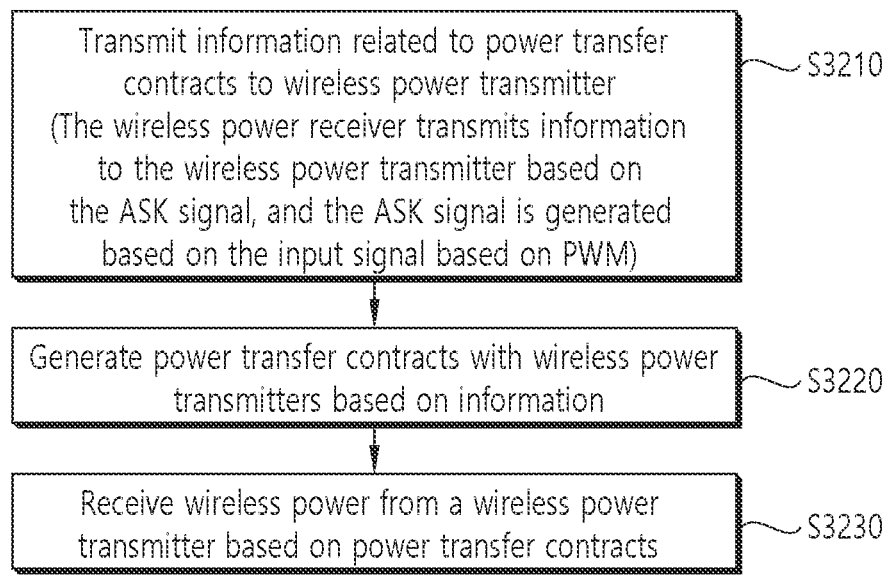
FIG. 32 is a flowchart of a method for transmitting an ASK signal based on PWM, performed by a wireless power receiver, according to an embodiment of the present specification.

FIG. 32 is a flowchart of a method for transmitting an ASK signal based on PWM, performed by a wireless power receiver, according to an embodiment of the present specification.

The wireless power receiver may transmit information related to the power transfer contract to the wireless power transmitter (S3210). Here, the wireless power receiver may transmit the information to the wireless power transmitter based on an amplitude shift keying (ASK) signal. And, the ASK signal can be generated based on an input signal based on PWM (pulse width modulation).

At this time, the wireless power receiver may control the ASK signal based on adjustment of the frequency or phase of the PWM. At this time, the wireless power receiver may adjust the frequency or the phase of the PWM based on power intensity or coupling degree.

For example, based on the power intensity or the low degree of coupling, the wireless power receiver may increase modulation of the ASK signal. Specifically, the wireless power receiver may match the phase with the phase of the input signal. Alternatively, the wireless power receiver may increase the frequency of the input signal.

Or, for example, based on whether the power intensity or the degree of coupling is high, the wireless power receiver may reduce modulation of the ASK signal. Specifically, the wireless power receiver may match the phase to the opposite of the phase of the input signal. Alternatively, the wireless power receiver may reduce the frequency of the input signal.

Thereafter, the wireless power receiver may create a power transfer contract with the wireless power transmitter based on the information (S3220). Here, a specific example of creating a power transfer contract is as described above.

The wireless power receiver may receive the wireless power from the wireless power transmitter based on the power transfer contract (S3230). Likewise, a specific example of receiving wireless power is also the same as described above.

Although not separately shown, this specification may provide a wireless power receiver. A wireless power receiver may include a power pickup associated with receiving wireless power from a wireless power transmitter and a communication/controller associated with communicating with the wireless power transmitter and controlling the reception of the wireless power. Here, the communication/controller may be configured to transmit information related to the power transfer agreement to the wireless power transmitter, be configured to generate the power transfer agreement with the wireless power transmitter based on the information, and be configured to receive the wireless power from the wireless power transmitter based on the power transfer contract. At this time, the wireless power receiver transmits the information to the wireless power transmitter based on an amplitude shift keying (ASK) signal, and the ASK signal may be generated based on an input signal based on pulse width modulation (PWM). Specific examples of the wireless power receiver provided in this specification are as described above.

Figure 33:
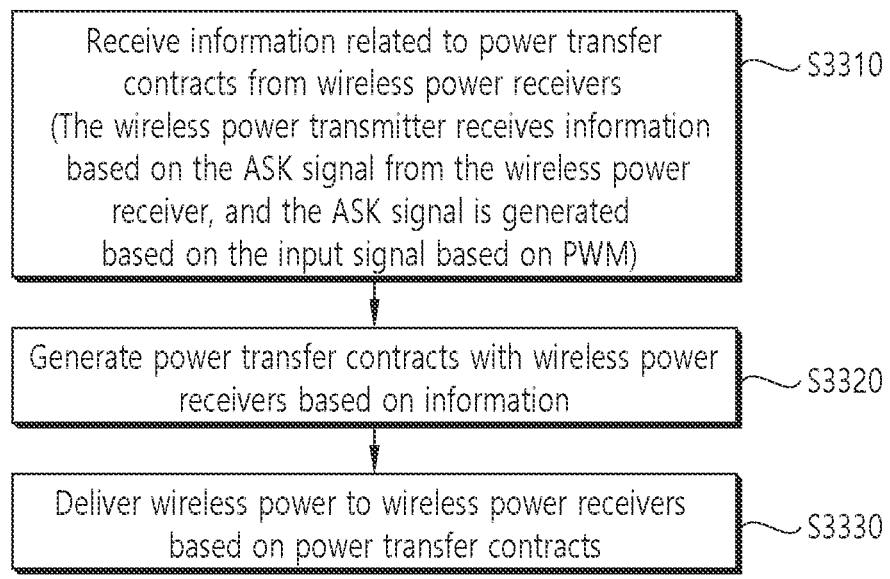
FIG. 33 is a flowchart of a method of receiving an ASK signal based on PWM, performed by a wireless power transmitter, according to an embodiment of the present specification.

FIG. 33 is a flowchart of a method of receiving an ASK signal based on PWM, performed by a wireless power transmitter, according to an embodiment of the present specification.

According to FIG. 33, the wireless power transmitter can receive information related to the power transfer contract from the wireless power receiver (S3310). Here, the wireless power transmitter may receive the information based on an amplitude shift keying (ASK) signal from the wireless power receiver. And, the ASK signal can be generated based on an input signal based on PWM (pulse width modulation). A specific example in which the ASK signal is generated based on a PWM-based input signal is as described above.

The wireless power transmitter may create the power transfer contract with the wireless power receiver based on the information. A specific example in which a wireless power transmitter and a wireless power receiver create a power transfer agreement is as described above.

The wireless power transmitter may transfer the wireless power to the wireless power receiver based on the power transfer contract (S3330). A specific example in which a wireless power transmitter transfers wireless power to a wireless power receiver is as described above.

Although not separately shown, this specification may provide a wireless power transmitter. A wireless power transmitter may include a power converter associated with transmitting wireless power to a wireless power receiver and a communicator/controller associated with communicating with the wireless power receiver and controlling the transmission of the wireless power. Here, the communicator/controller may be configured to receive information related to a power transfer agreement from a wireless power receiver, be configured to generate the power transfer agreement with the wireless power receiver based on the information, and be configured to transfer the wireless power to the wireless power receiver based on the power transfer contract. At this time, the wireless power transmitter receives the information based on an amplitude shift keying (ASK) signal from the wireless power receiver, and the ASK signal may be generated based on an input signal based on pulse width modulation (PWM). Specific examples of the wireless power transmitter provided in this specification are as described above.

So far, the embodiments of this specification have been described. And, according to the embodiment described above, the following effects may occur. Hereinafter, the effect of this specification will be explained from two major perspectives.

1. For High Power Situations

As previously explained, when the wireless power receiver transmits an ASK-based signal to the wireless power transmitter in a high power situation, a problem may occur in which the depth of the ASK signal is excessively amplified, this may cause heat generation in the wireless power receiver and cause problems with the stability of the device. In addition, due to the large depth, problems may occur that impair the stability of the wireless power receiver in terms of battery and power control.

When applying the configurations according to the present specification, the wireless power receiver can reduce the depth of the ASK signal even in high power situations. As a result, according to the present specification, the cause of the above problems can be eliminated.

That is, in the wireless power receiver according to the present specification, heat generation can be managed even in high power situations, and since no significant heat generation occurs, it is also advantageous in terms of stability of the device of the wireless power receiver. In addition, since the depth of the generated ASK signal can be reduced, the wireless power receiver can maintain its battery at a constant voltage/current even in high power situations. Accordingly, the wireless power receiver according to the present specification has an advantage in terms of power management.

As in this specification, an example of improving the quality of the ASK signal through control of the MOSFET using PWM can be confirmed through the simulation results below.

Figure 34:
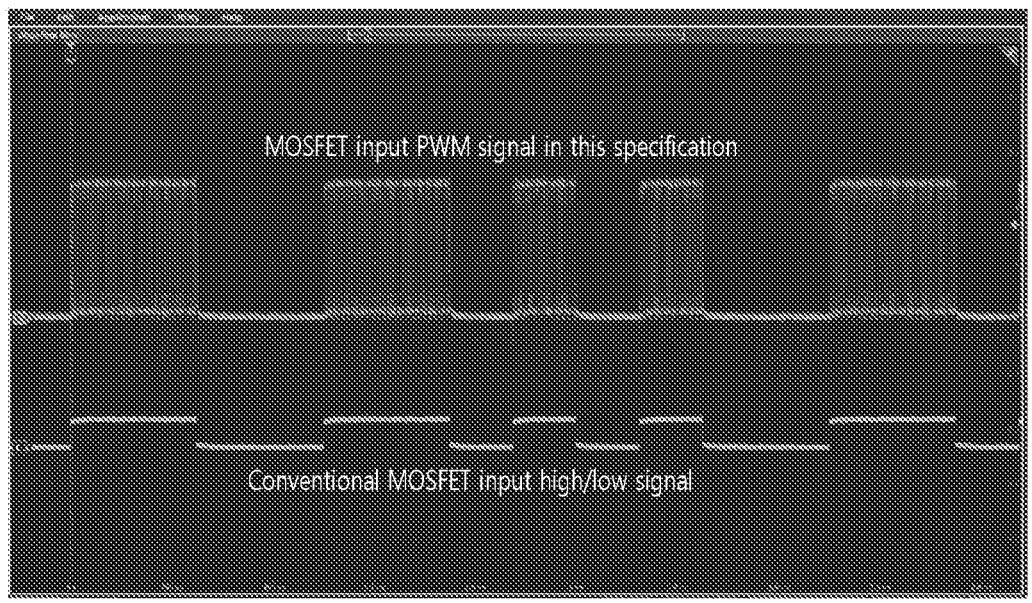
FIG. 34 shows an example of an input signal based on PWM, according to an embodiment of the present specification.

FIG. 34 shows an example of an input signal based on PWM, according to an embodiment of the present specification.

As can be seen at the bottom of FIG. 34, while the wireless power receiver previously input high/low signals to the MOSFET, in this specification, as shown at the top of FIG. 34, a PWM signal can be input to the MOSFET.

When the above input signal is input, the quality improvement results shown below can be obtained.

Figure 35:
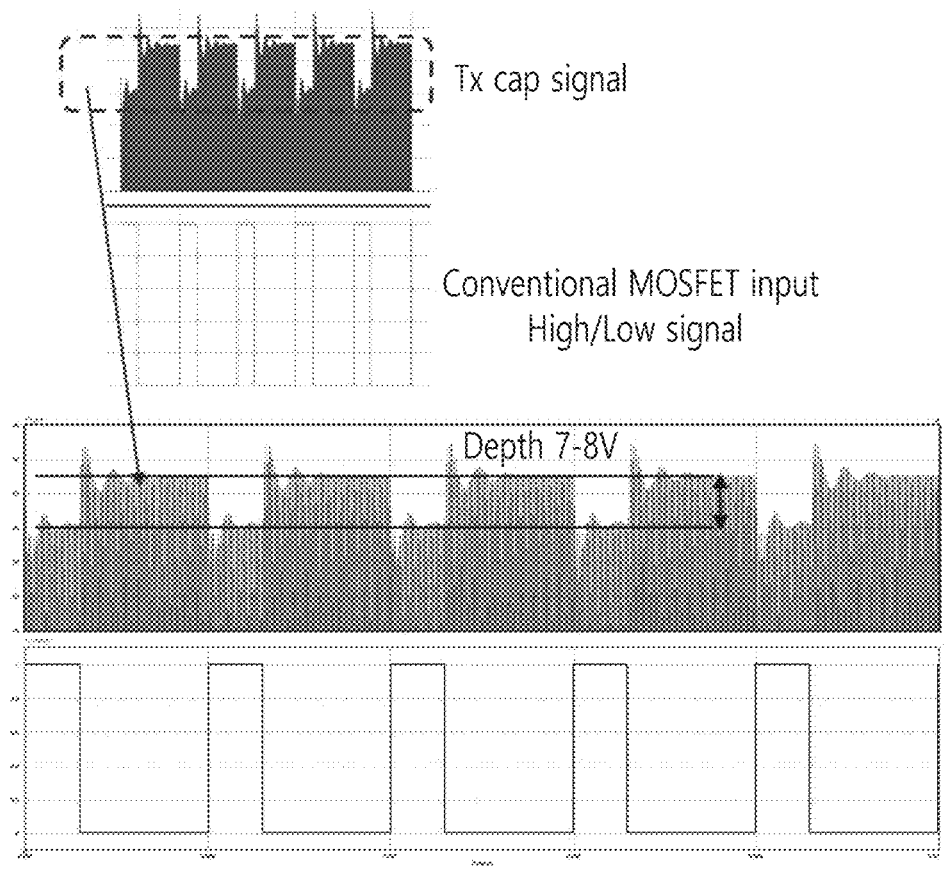
FIGS. 35 and 36 show simulation results of quality improvement according to an embodiment of the present specification.
Figure 36:
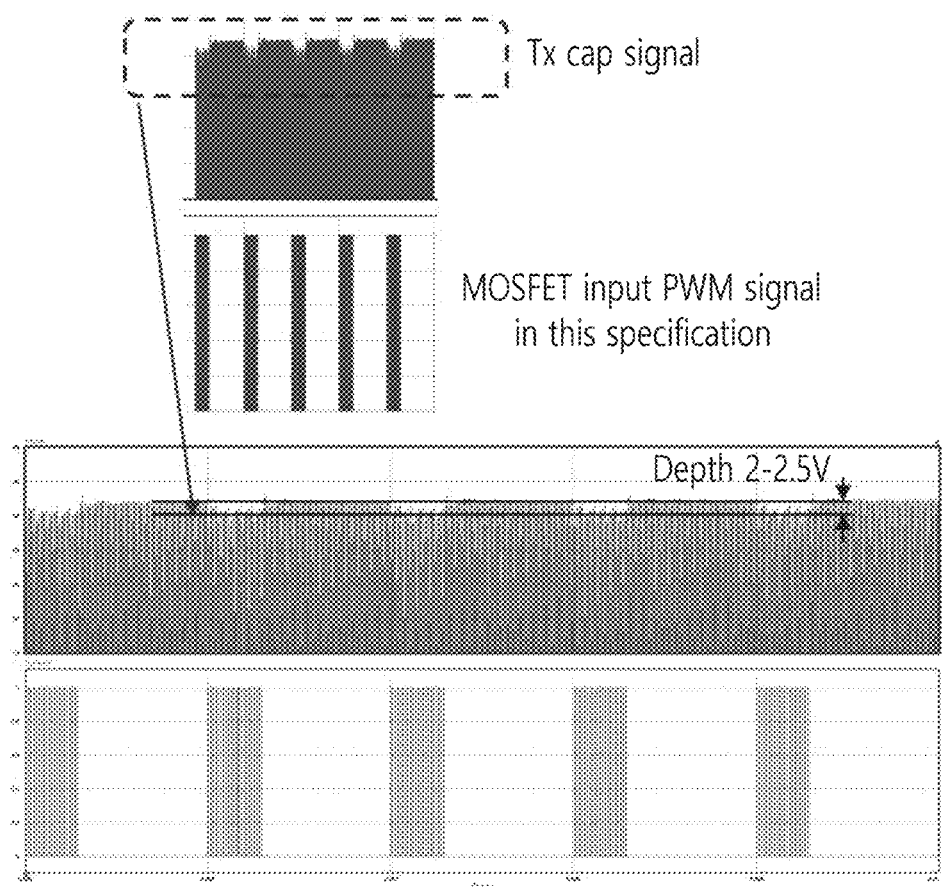

FIGS. 35 and 36 show simulation results of quality improvement according to an embodiment of the present specification.

As shown at the top of FIG. 34 and as shown in FIG. 35, in the existing case, high/low signals are input to the MOSFET, so the depth of the generated ASK signal may be very large. And, due to the large depth (e.g., 7-8V), as previously explained, simulation results in which overshooting/undershooting are amplified may occur.

As shown at the bottom of FIG. 34 and as shown in FIG. 36, according to embodiments of the present specification, since the PWM signal is input to the MOSFET as an input signal, the depth of the generated ASK signal may be reduced. And, due to the reduced depth (e.g., 2-2.5V), simulation results with reduced overshooting/undershooting may occur as described above.

That is, when the PWM signal is an input signal, as in the embodiment of the present specification, the ASK depth can be reduced, so the fluctuation of power transmission is reduced even at high power. And communication quality can also be improved.

2. For Low Power and/or Low Coupling Situations

As explained previously, in a low power situation or a low coupling situation (originally a high power situation, but the alignment between the wireless power transmitter and the wireless power receiver is misaligned, so wireless charging is inevitably performed under low power), due to an excessively low depth, the difference between the operating state and the modulation state of the ASK signal transmitted from the wireless power receiver to the wireless power transmitter may be minimal.

Because of this, it may be difficult for the wireless power transmitter to distinguish/identify/decode whether the ASK signal it received indicates an operating state or a modulation state.

When applying the configurations according to the present specification, the wireless power receiver can increase the depth of the ASK signal even in low power and/or low coupling situations. As a result, according to the present specification, the cause of the above problems can be eliminated.

That is, when the wireless power receiver generates an ASK signal using a PWM signal as an input signal according to the present specification, the depth of the output ASK signal can be increased. Accordingly, even in low power and/or low coupling situations, the wireless power transmitter can receive an ASK signal with a sufficiently large depth value from the wireless power receiver. Because of this, the wireless power transmitter can distinguish/identify/decode with high accuracy whether the ASK signal indicates an operating state or a modulation state, even in low power and/or low coupling situations.

In other words, when the PWM signal is an input signal as in the embodiments of the present specification, the ASK depth can be increased, so the shaking of power transmission can be reduced by increasing the amplitude even at low power and/or low coupling. Accordingly, the wireless power transmitter can stably decode the ASK signal, and thus the stability of ASK communication can be secured.

Effects obtainable through specific examples of the present specification are not limited to the effects listed above. For example, there may be various technical effects that a person having ordinary skill in the related art can understand or derive from this specification. Accordingly, the specific effects of the present specification are not limited to those explicitly described in the present specification, and may include various effects that can be understood or derived from the technical features of the present specification.

The claims set forth herein can be combined in a variety of ways. For example, the technical features of the method claims of this specification may be combined to be implemented as a device, and the technical features of the device claims of this specification may be combined to be implemented as a method. In addition, the technical features of the method claims of the present specification and the technical features of the device claims may be combined to be implemented as a device, and the technical features of the method claims of the present specification and the technical features of the device claims may be combined to be implemented as a method.

What is claimed is:

1. A method for receiving a wireless power in a wireless power transfer system, the method performed by a wireless power receiver and comprising:
   transmitting information related to a power transfer contract to a wireless power transmitter;
   generating the power transfer contract with the wireless power transmitter based on the information; and
   receiving the wireless power from the wireless power transmitter based on the power transfer contract,
   wherein the wireless power receiver transmits the information to the wireless power transmitter based on an amplitude shift keying (ASK) signal, which is generated based on a pulse width modulation (PWM),
   wherein the wireless power receiver controls the ASK signal based on adjusting a frequency or a phase of the PWM using power intensity or coupling degree, and
   wherein the wireless power receiver increases modulation of the ASK signal based on that the power intensity or the coupling degree is low.

2. The method of claim 1, wherein the wireless power receiver matches the phase with a phase of an input signal based on the PWM.

3. The method of claim 2, wherein the wireless power receiver increases the frequency of an input signal based on the PWM.

4. The method of claim 1, wherein the wireless power receiver reduces modulation of the ASK signal based on that the power intensity or the coupling degree is high.

5. The method of claim 4, wherein the wireless power receiver matches the phase opposite to a phase of an input signal based on the PWM.

6. The method of claim 5, wherein the wireless power receiver reduces the frequency of an input signal based on the PWM.

7. A wireless power receiver comprising:
   a power pickup related to receiving wireless power from a wireless power transmitter; and
   a communicator/controller related to communicating with the wireless power transmitter and controlling reception of the wireless power,
   wherein the communicator/controller is configured to:
   transmit information related to a power transfer contract to the wireless power transmitter;
   generate the power transfer contract with the wireless power transmitter based on the information; and
   receive the wireless power from the wireless power transmitter based on the power transfer contract,
   wherein the wireless power receiver transmits the information to the wireless power transmitter based on an amplitude shift keying (ASK) signal, which is generated based on a pulse width modulation (PWM),
   wherein the wireless power receiver controls the ASK signal based on adjusting a frequency or a phase of the PWM using power intensity or coupling degree, and
   wherein the wireless power receiver increases modulation of the ASK signal based on that the power intensity or the coupling degree is low.

8. A method for transmitting a wireless power in a wireless power transfer system, the method performed by a wireless power transmitter and comprising:
   receiving information related to a power transfer contract from a wireless power receiver;
   generating the power transfer contract with the wireless power receiver based on the information; and
   transmitting the wireless power to the wireless power receiver based on the power transfer contract,
   wherein the wireless power transmitter receives the information from the wireless power receiver based on an amplitude shift keying (ASK) signal, which is generated based on a pulse width modulation (PWM),
   wherein the ASK signal is controlled based on adjusting a frequency or a phase of the PWM using power intensity or coupling degree, and
   wherein modulation of the ASK signal is increased based on that the power intensity or the coupling degree is low.

* * * * *